(12) United States Patent
Lee et al.

(10) Patent No.: US 12,553,736 B2
(45) Date of Patent: Feb. 17, 2026

(54) AR DISPLAY DEVICE FOR VEHICLE AND METHOD FOR OPERATING SAME

(71) Applicant: LG ELECTRONICS INC., Seoul (KR)

(72) Inventors: Jieun Lee, Seoul (KR); Jisuk Chae, Seoul (KR); Hansung Lee, Seoul (KR); Junghoon Son, Seoul (KR); Jinhyuk Hong, Seoul (KR); Ilwan Kim, Seoul (KR); Byeongjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 18/208,550

(22) Filed: Jun. 12, 2023

(65) Prior Publication Data

US 2023/0400321 A1 Dec. 14, 2023

(30) Foreign Application Priority Data

Jun. 10, 2022 (KR) .......................... 10-2022-0070770
Oct. 19, 2022 (WO) ................ PCT/KR2022/015979

(51) Int. Cl.
*G01C 21/36* (2006.01)
*B60K 35/10* (2024.01)
(Continued)

(52) U.S. Cl.
CPC ............ *G01C 21/365* (2013.01); *B60K 35/10* (2024.01); *B60K 35/223* (2024.01); *B60K 35/25* (2024.01);
(Continued)

(58) Field of Classification Search
CPC .................. G06T 19/006; B60K 35/50; B60K 2360/177; G06V 20/20; G06V 20/58; G08G 1/09623; G08G 1/0969
See application file for complete search history.

(56) References Cited

U.S. PATENT DOCUMENTS 6,182,010 B1   1/2001 Berstis
9,403,436 B1   8/2016 Yamada
(Continued)

FOREIGN PATENT DOCUMENTS

EP       2739939        11/2016
JP      2012032811       2/2012
(Continued)

OTHER PUBLICATIONS

United States Patent and Trademark Office U.S. Appl. No. 18/208,537, Office Action dated Mar. 5, 2025, 30 pages.
(Continued)

*Primary Examiner* — Grace Q Li
(74) *Attorney, Agent, or Firm* — LEE, HONG, DEGERMAN, KANG & WAIMEY

(57) ABSTRACT

An Augmented Reality (AR) display device interoperating with a vehicle and a method for operating the same are disclosed. An AR display device interoperating with a vehicle according to the present disclosure can predict a context in which a problem may occur by additionally considering an external resource in addition to map data and sensing data as internal resources while the vehicle travels, and display the predicted context by varying an AR graphic interface in real time, thereby intuitively notifying a driver of the predicted context and a countermeasure therefor. At this time, an AR object separated from the AR graphic interface not only displays a guide for the predicted context but also provides a corresponding guide for safe driving in the predicted context.

17 Claims, 19 Drawing Sheets

(51) Int. Cl.

| | |
|---|---|
| *B60K 35/22* | (2024.01) |
| *B60K 35/25* | (2024.01) |
| *B60K 35/50* | (2024.01) |
| *B60K 35/60* | (2024.01) |
| *B60K 35/80* | (2024.01) |
| *B60K 35/90* | (2024.01) |
| *B60L 53/66* | (2019.01) |
| *B60R 1/24* | (2022.01) |
| *G06T 19/00* | (2011.01) |
| *B60K 35/26* | (2024.01) |
| *G08G 1/0967* | (2006.01) |

(52) U.S. Cl.
CPC .............. *B60K 35/50* (2024.01); *B60K 35/60* (2024.01); *B60K 35/80* (2024.01); *B60K 35/90* (2024.01); *B60R 1/24* (2022.01); *G06T 19/006* (2013.01); *B60K 35/265* (2024.01); *B60L 53/66* (2019.02); *B60R 2300/304* (2013.01); *B60R 2300/802* (2013.01); *B60R 2300/8093* (2013.01); *G08G 1/096766* (2013.01)

(56) References Cited

U.S. PATENT DOCUMENTS

| | | |
|---|---|---|
| 9,586,579 B1 | 3/2017 | Laskowsky et al. |
| 9,852,547 B2 | 12/2017 | Bostick et al. |
| 2006/0058945 A1 | 3/2006 | Watanabe |
| 2009/0030601 A1 | 1/2009 | Sawaki et al. |
| 2010/0164702 A1 | 7/2010 | Sasaki et al. |
| 2012/0008048 A1 | 1/2012 | Sekine et al. |
| 2016/0003636 A1 | 1/2016 | Ng-Thow-Hing et al. |
| 2016/0129836 A1 | 5/2016 | Sugita et al. |
| 2016/0349066 A1 | 12/2016 | Chung et al. |
| 2017/0092130 A1 | 3/2017 | Bostick et al. |
| 2018/0099661 A1 | 4/2018 | Bae et al. |
| 2018/0130351 A1 | 5/2018 | Ha et al. |
| 2018/0157036 A1* | 6/2018 | Choi ..................... G09G 3/001 |
| 2019/0180485 A1 | 6/2019 | Kim et al. |
| 2019/0226866 A1 | 7/2019 | Chang |
| 2019/0232952 A1 | 8/2019 | Kim et al. |
| 2020/0116518 A1 | 4/2020 | Lee |
| 2020/0219325 A1 | 7/2020 | Seo et al. |
| 2020/0307616 A1 | 10/2020 | Nithiyanantham et al. |
| 2021/0039715 A1* | 2/2021 | Ferrer ..................... G06V 20/58 |
| 2021/0078503 A1 | 3/2021 | Horihata et al. |
| 2021/0108926 A1 | 4/2021 | Tran |
| 2021/0207971 A1 | 7/2021 | Kim et al. |
| 2021/0215499 A1 | 7/2021 | Kassner et al. |
| 2021/0223058 A1 | 7/2021 | Horihata et al. |
| 2021/0372810 A1 | 12/2021 | Hato et al. |
| 2021/0385611 A1 | 12/2021 | Takahara |
| 2022/0080828 A1 | 3/2022 | Sung et al. |
| 2023/0030600 A1 | 2/2023 | Shi et al. |
| 2023/0037767 A1 | 2/2023 | Yang et al. |
| 2023/0121388 A1 | 4/2023 | Khan et al. |
| 2023/0221569 A1 | 7/2023 | Ohyama et al. |
| 2023/0360331 A1 | 11/2023 | Wan et al. |
| 2024/0017736 A1 | 1/2024 | Kume et al. |

FOREIGN PATENT DOCUMENTS

| | | |
|---|---|---|
| JP | 2022058537 | 4/2022 |
| KR | 20170101758 | 9/2017 |
| KR | 1020170101758 | 9/2017 |
| KR | 1020190078676 | 7/2019 |
| KR | 1020190136691 | 12/2019 |
| KR | 10-2020-0070101 | 6/2020 |
| KR | 20230065287 | 5/2023 |
| WO | 2020166252 | 8/2020 |
| WO | 2022080146 | 4/2022 |

OTHER PUBLICATIONS

United States Patent and Trademark Office U.S. Appl. No. 18/208,540, Office Action dated Feb. 5, 2025, 41 pages.
United States Patent and Trademark Office U.S. Appl. No. 18/208,622, Office Action dated Apr. 21, 2025, 41 pages.
PCT International Application No. PCT/KR2022/015979, International Search Report dated Mar. 9, 2023, 8 pages.
European Patent Office Application Serial No. 23175929.1, Search Report dated Nov. 7, 2023, 18 pages.
Prasad, "Identifying Lane Changes Automatically using the GPS Sensor for Portable Devices," Delft University of Technology, Nov. 2021, 31 pages.
Gayathiri et al., "Lane Change Detection And Tracking For A Safe-Lane Approach In Real Time Vision Based Navigation Systems," Deparetment of Electrical and Electronics Engineering, Amrita School of Engineering, CS & IT-CSCP, Jan. 2011, 31 pages.
Wikipedia, "Augmented reality," Jun. 2022, 46 pages.
European Patent Office Application Serial No. 23175932.5, Search Report dated Nov. 2, 2023, 11 pages.
Korean Intellectual Property Office Application No. 10-2023-7018105, Office Action dated Oct. 26, 2023, 6 pages.
European Patent Office Application Serial No. 23175934.1, Search Report dated Nov. 2, 2023, 17 pages.
European Patent Office Application Serial No. 23175933.3, Search Report dated Nov. 2, 2023, 13 pages.
European Patent Office Application Serial No. 23175934.1, Search Report dated Feb. 8, 2024, 14 pages.
United States Patent and Trademark Office U.S. Appl. No. 18/208,537, Office Action dated Jul. 3, 2025, 26 pages.
United States Patent and Trademark Office U.S. Appl. No. 18/208,540, Notice of Allowance dated Aug. 15, 2025, 15 pages.
European Patent Office Application Serial No. 23175929.1, Office Action dated Dec. 16, 2025, 9 pages.
European Patent Office Application Serial No. 23175934.1, Office Action dated Dec. 16, 2025, 10 pages.

* cited by examiner

FIG. 16
(a) 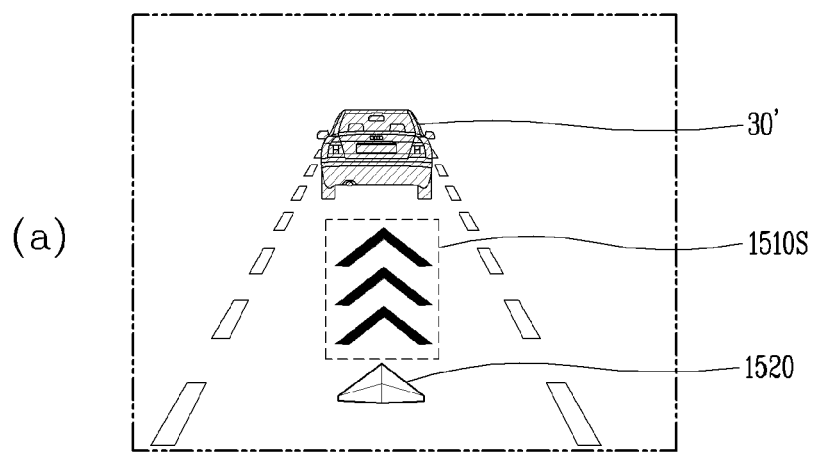
(b) 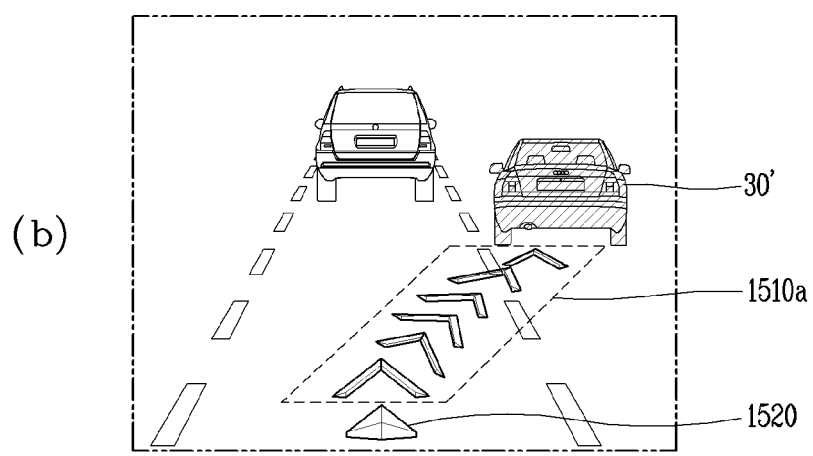

AR DISPLAY DEVICE FOR VEHICLE AND METHOD FOR OPERATING SAME

CROSS-REFERENCE TO RELATED APPLICATION

Pursuant to 35 U.S.C. § 119, this application claims the benefit of earlier filing date and right of priority to Korean Application No. 10-2022-0070770, filed on Jun. 10, 2022, and International Application No. PCT/KR2022/015979, filed on Oct. 19, 2022, the contents of which are all incorporated by reference herein in their entirety.

TECHNICAL FIELD

The present disclosure relates to an Augmented Reality (AR) display device interoperating with a vehicle, a method for operating the same, and more specifically, to an AR display device capable of displaying an AR guide for a driving situation in advance in front of the vehicle, and a method for operating the same.

BACKGROUND ART

For safety and convenience of a user who uses a vehicle, various sensors and devices are disposed at the vehicle, and functions of the vehicle are diversified. The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function of the vehicle is a technique of ensuring safeties of the driver and/or pedestrians, and may include various functions, such as a lane departure warning system (LDWS), a lane keeping assist system (LKAS), an autonomous emergency braking (AEB), and the like.

Recently, Augmented Reality (AR) that outputs a graphic object through a windshield of a vehicle or a Head Up Display (HUD) or additionally outputs a graphic object to the real world by outputting the graphic object to an image captured by a camera is being actively developed. In particular, the development of technologies for guiding a route (or path) to a driver by utilizing an augmented reality (AR) technology is further increasing.

Meanwhile, in the past, even if such an augmented reality (AR) technology was applied to route guidance according to an AR driving mode, existing driving guidance was simply displayed in an AR form. For example, driving direction change guidance was merely output as an AR image at a fixed position.

Accordingly, it was difficult to distinguish the AR image from other AR features of the AR driving mode, which caused a limit to providing intuitive route guidance. In addition, a driver who was inexperienced in driving was limited to driving a vehicle accurately according to the guidance. This is the same even if a remaining distance value is displayed together with the driving direction change guidance. Therefore, research is needed to perform a more intuitive and complete AR driving mode.

In addition, in the case of an existing route guidance to which an augmented reality (AR) technology is applied, an associated guidance is performed based on sensing data of the vehicle or navigation information, which causes a limit in displaying more various driving situations.

DISCLOSURE OF INVENTION

Technical Problem

The present disclosure is directed to solving the above-mentioned problems and other drawbacks.

According to some embodiments, an aspect of the present disclosure is to provide an AR display device capable of performing a more intuitive and highly complete AR driving mode, and a method for operating the same.

According to some embodiments, another aspect of the present disclosure is to provide an AR display device capable of providing an AR guidance for more various driving situations by considering an external resource such as network data as well as sensing data of a vehicle, and a method for operating the same.

According to some embodiments, another aspect of the present disclosure is to provide an AR display device capable of receiving responses to various predicted driving situations, situation explanation, driving guidance as information in an intuitive AR form, and a method for operating the same.

According to some embodiments, another aspect of the present disclosure is to provide an AR display device capable of indicating notification and affirmative action guide according to a state diagnosis of a vehicle by using AR objects that can be separated, deformed, and combined, and a method for operating the same.

According to some embodiments, another aspect of the present disclosure is to provide an AR display device capable of quickly and accurately displaying information related to parking or charging by using AR objects, which can be separated, deformed, and combined, through communication with a control server when a vehicle enters a parking lot/charging station, and a method for operating the same.

Solution to Problem

To achieve those aspects and other advantages, an AR display device interoperating with a vehicle according to the present disclosure can predict a context (situation) in which a problem may occur by additionally considering an external resource in addition to map data and sensing data as internal resources while the vehicle travels, and display the predicted context by varying an AR graphic interface in real time, thereby intuitively providing a driver with the predicted context and a corresponding action responsive thereto.

To this end, an AR object separated from the AR graphic interface not only displays a guide for the predicted context but also provides a corresponding guide for safe driving in the predicted context.

Specifically, an augmented reality (AR) display device may include a communication module configured to receive image data including a front image of the vehicle, location data including a current location of the vehicle, map data relating to the current location of the vehicle, state data of the vehicle, and network data of the vehicle; a processor configured to activate a preset application to render an AR graphic interface overlapping the front image, the AR graphic interface including a first AR object indicating a current driving state of the vehicle and a second AR object indicating a guide for driving based on the current location of the vehicle and the map data; and a display configured to display a navigation screen including the front image overlapped by the AR graphic interface according to the rendering. Wherein the processor is further configured to predict a context to occur based on the state data of the vehicle and the network data, and update the AR graphic interface based on the prediction in a manner that separating the second AR object and changing the separated second AR object into driving guide information related to the predicted context. Also, wherein the driving guide information includes additional information related to the predicted context In an embodiment, the context to occur may be one of a detection of hidden obstacles that do not appear in the front image in the video in front of the vehicle and possibility of collision, a detection of and possibility of collision with a route to be followed and a possibility of collision due to a selection of a vehicle in front to be followed, diagnostic prediction and determination of driving prohibition based on the state of the vehicle, congestion and a possibility of detouring of a current driving route, and a detection of a charging allowable area due to the vehicle entering a charging station.

In an embodiment, the processor may update the second AR object, which is separated from the first AR object, to be displayed at a location associated with an occurrence of the predicted context while the first AR object keeps displaying the current driving state of the vehicle.

In an embodiment, the processor may determine whether to include additional information in the second AR object based on a separation distance between the displayed location of the separated second AR object and a current location of the vehicle corresponding to the first AR object, and change the separated second AR object based on the determination.

In an embodiment, the additional information may at least one of a warning about the hidden obstacle, a change in driving speed or driving direction of the vehicle in front to be followed, inspection of the vehicle, charging of the vehicle, route guidance in a parking or stopping area, guidance for congestion-related information and detour route, charging status, and rate information of the charging of the vehicle.

In an embodiment, the processor may determine a detection of the context to occur by combining the network data with at least one of the map data, sensing data of the vehicle, and location data updated of the vehicle, and display at least one of location information and situation information corresponding to the context through the separated second AR object on the front image based on the determination.

In an embodiment, the at least one of the location information and the situation information may be associated with the current driving state of the vehicle corresponding to the first AR object.

In an embodiment, the separated second AR object includes a plurality of fragments, and wherein the processor may change the separated second AR object such that the plurality of fragments displays a plurality of trajectories drawn from the first AR object toward a location of an object corresponding to the context.

In an embodiment, the plurality of trajectories may include a driving guide for a next driving state of the vehicle based on a moving state of the object corresponding to the context.

In an embodiment, the location information may include a new driving direction or driving route corresponding to the context based on a current location of the vehicle, and the situation information may include road condition data collected with respect to a current driving lane or a set driving route of the vehicle.

In an embodiment, the processor may vary the separated second AR object to include guide trajectories for guiding the new driving direction or driving route, starting from the first AR object, based on the collected road condition data.

In an embodiment, the processor may update the separated second AR object to display information related to the road condition data between the first AR object and the guide trajectories.

In an embodiment, the network data may include one or more of third party service related data received during the driving of the vehicle, intelligent transportation system (ITS) related data, V2V/V2X communication data, and communication data received from a parking/charging control server.

In an embodiment, the processor may update the AR graphic interface into a combined form of the first AR object and the second AR object when it is recognized that the estimated context has ended based on the network data. In an embodiment, in response to the vehicle entering a charging station, the processor may connect communication with a server disposed in the charging station through the communication module to provide state data of the vehicle to the server, separate the second AR object to display a first guide route by receiving first route information for guiding the vehicle to an available charger from the server based on the state data, and update the separated second AR object to display a second guide route by receiving second route information for guiding the vehicle up to an exit of the charging station from the server when charging of the vehicle ends.

In an embodiment, when there is a plurality of available chargers, the processor may divide the separated second AR object to display different selectable guide routes for guiding the vehicle up to the respective available chargers.

In an embodiment, the processor may update the second AR object to additionally display charging information received from the server, in response to the vehicle approaching the available charger along the first guide route displayed through the second AR object.

Alternatively, the above-identified functions performed by the processor of the AR display device may be performed by one or more processors located outside the AR display device.

Advantageous Effects of Invention

Hereinafter, effects of an AR display device of a vehicle and a method for operating the same according to the present disclosure will be described.

According to an AR display device and a method for operating the same according to some embodiments of the present disclosure, an augmented reality navigation screen can be provided based on a calibrated front image without separate setting, and a predicted driving situation shown on a current navigation screen can be guided, together with a current location of a vehicle, by using AR objects, resulting in providing a more intuitive and realistic AR guidance to the vehicle.

In an AR display device and a method for operating the same according to an embodiment of the present disclosure, a context to possibly occur can be estimated by additionally considering an external resource such as network data in addition to sensing data and map data of a vehicle, which can result in providing an intuitive UX for more diverse driving situations that are predicted during driving. Accordingly, a driver can more easily and safely drive the vehicle.

In an AR display device and a method of operating the same according to an embodiment of the present disclosure, a possibility of collision with a hidden obstacle that is not visible in a front image can be avoided. In addition, when setting a vehicle in front to be followed, a driving direction and driving speed to be followed can be guided through an intuitive AR graphic interface, which can allow flexible following and avoidance of a possibility of collision. Also, a notification and countermeasure for a vehicle condition diagnosis can be provided more reliably, and a detour route can be provided by identifying in advance road congestion that is difficult to be confirmed based on navigation information.

In addition, when the vehicle enters a parking lot or charging station, a route guidance for a parking/charging allowable area, parking/charging related information, and a route guidance for an exit can be provided through a more intuitive AR graphic interface, thereby providing a direct and smart parking/charging related UX.

BRIEF DESCRIPTION OF DRAWINGS

FIGS. 15 and 16 are conceptual views illustrating various modified examples of an AR graphic interface for displaying guide information according to setting of a vehicle to be followed according to an embodiment of the present disclosure.

MODE FOR THE INVENTION

Figure 1:
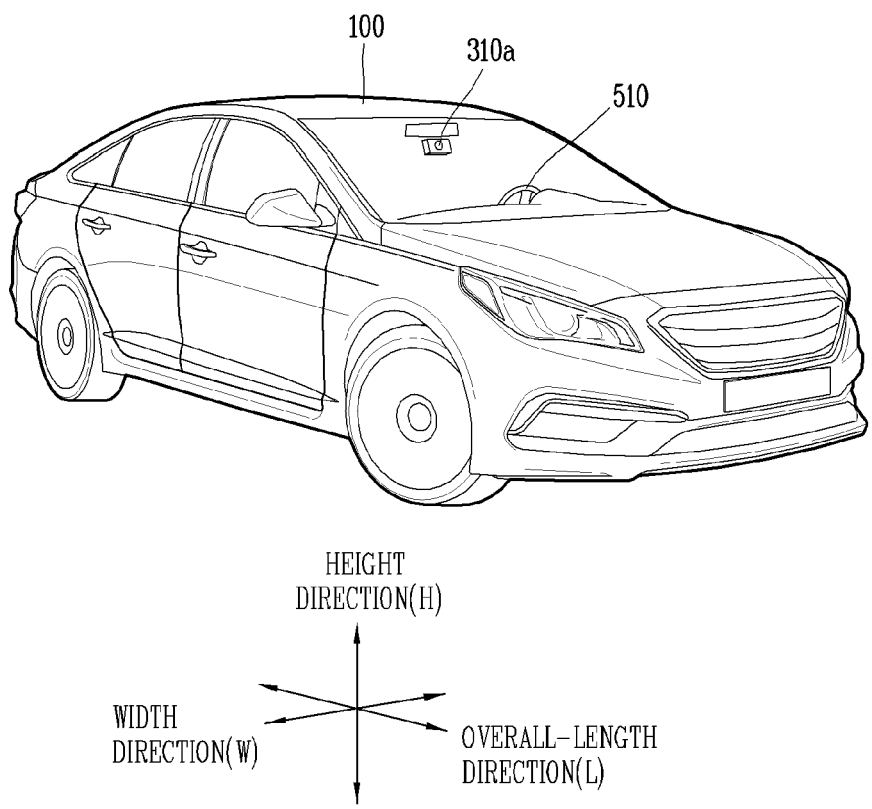
FIG. 1 is a diagram illustrating an example of a vehicle in accordance with an embodiment of the present disclosure.

Hereinafter, embodiments disclosed herein will be described in detail with reference to the accompanying drawings, and the same or similar elements are designated with the same numeral references, regardless of the numerals in the drawings, and their redundant description will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

The term "system" disclosed herein may include at least one of a server device and a cloud device, but is not limited thereto. For example, a system may include one or more server devices. As another example, a system may include one or more cloud devices. As still another example, a system may be operated by including a server device and a cloud device together.

The term "map information" or "map data" disclosed herein refers to a meaning including map information, map data, and map-related applications, such as an image captured through a vision sensor such as a camera, 2D map information, 3D map information, digital twin 3D map, high-definition map (HD map), and maps in real/virtual spaces.

The term "Point of Interest (POI) information" disclosed herein is a point of interest selected based on the map information or map data, and may include pre-registered POI information (POI stored in a map of a cloud server), user-set POI information (e.g., home, school, company, etc.), driving-related POI information (e.g., destination, via point, gas station, rest area, parking lot, etc.), and top search POI information (e.g., POI with recent clicks/visits, hot places, etc.). This POI information may be updated in real time based on a current location of the vehicle.

The term "front image" disclosed herein is obtained through a vehicle or a vision sensor around the vehicle, or an AR camera of an AR display device, for example, may include an image acquired or projected through a vision sensor (camera, laser sensor for image, etc.) while driving the vehicle, a real image itself projected on a windshield of the vehicle, or an image of a virtual space. That is, the front image may refer to a meaning including an image output through a display, an image projected through a laser sensor, or a real image itself viewed through the windshield of the vehicle.

Figure 2:
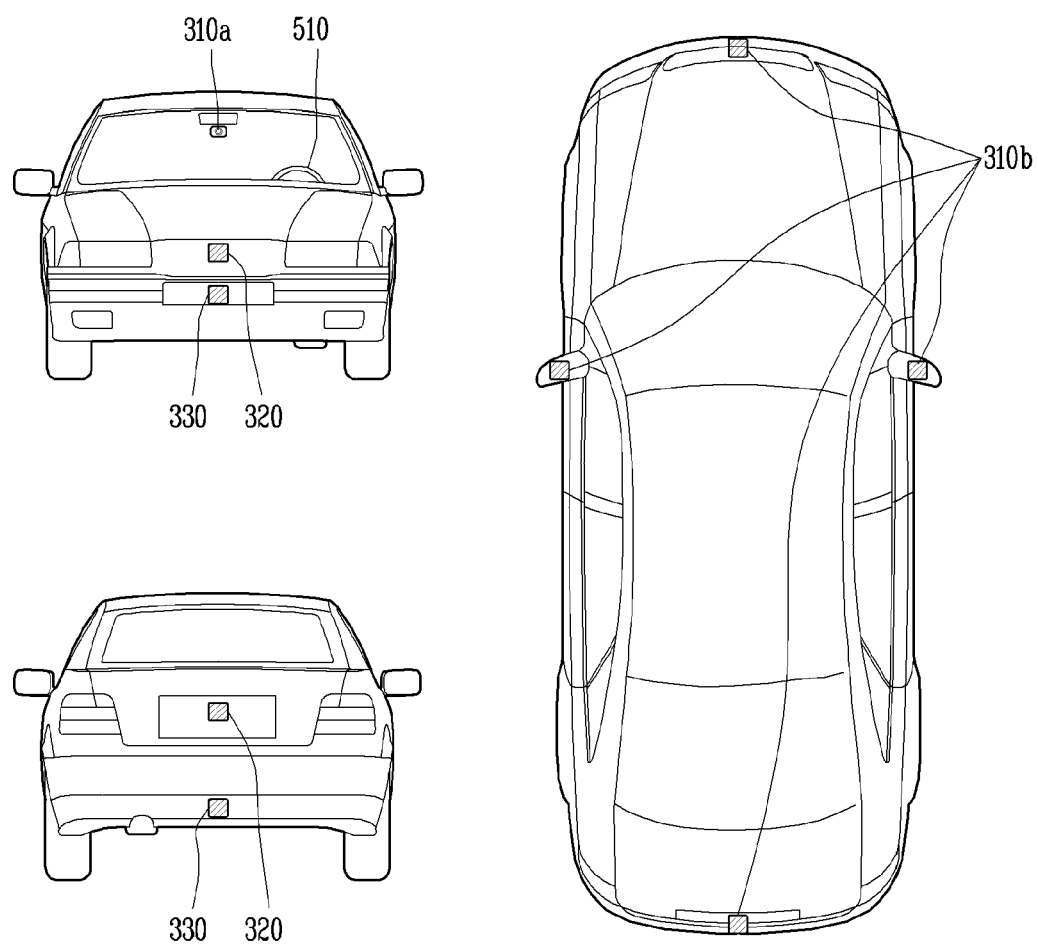
FIG. 2 is a diagram illustrating the vehicle in accordance with the embodiment at various angles.
Figure 3:
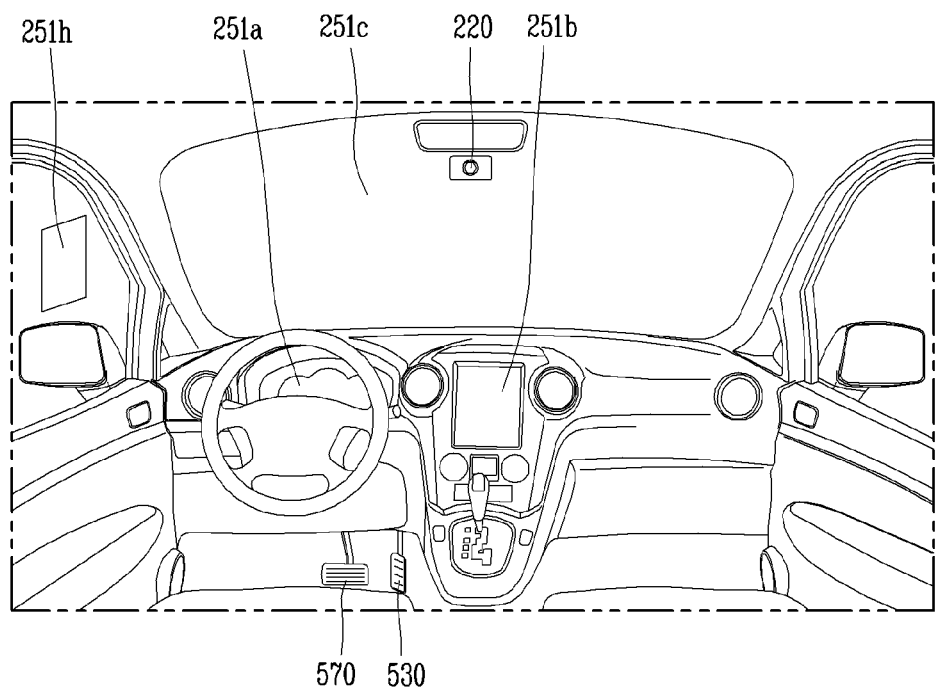
FIGS. 3 and 4 are diagrams illustrating an inside of the vehicle in accordance with the embodiment.
Figure 4:
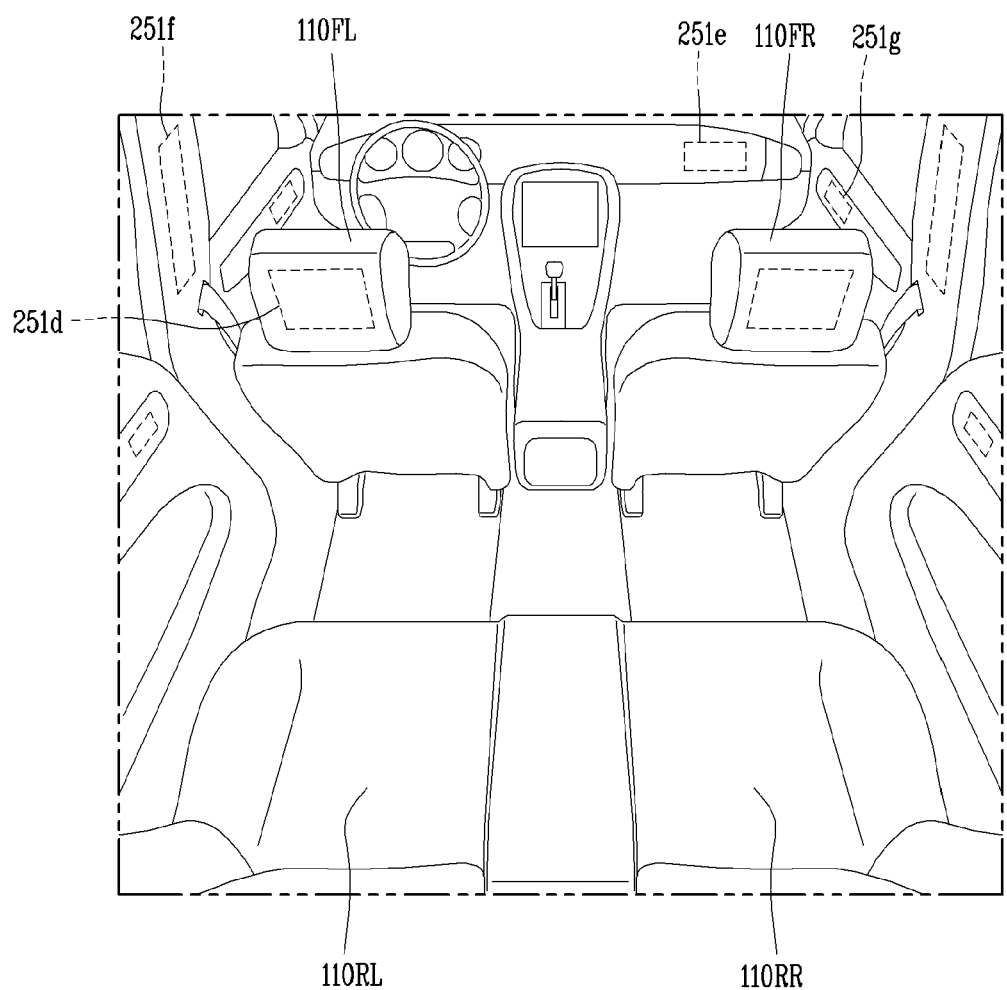

FIGS. 1 and 2 are diagrams illustrating the outside of a vehicle in accordance with the embodiment, and FIGS. 3 and 4 are diagrams illustrating the inside of the vehicle.

Figure 5:
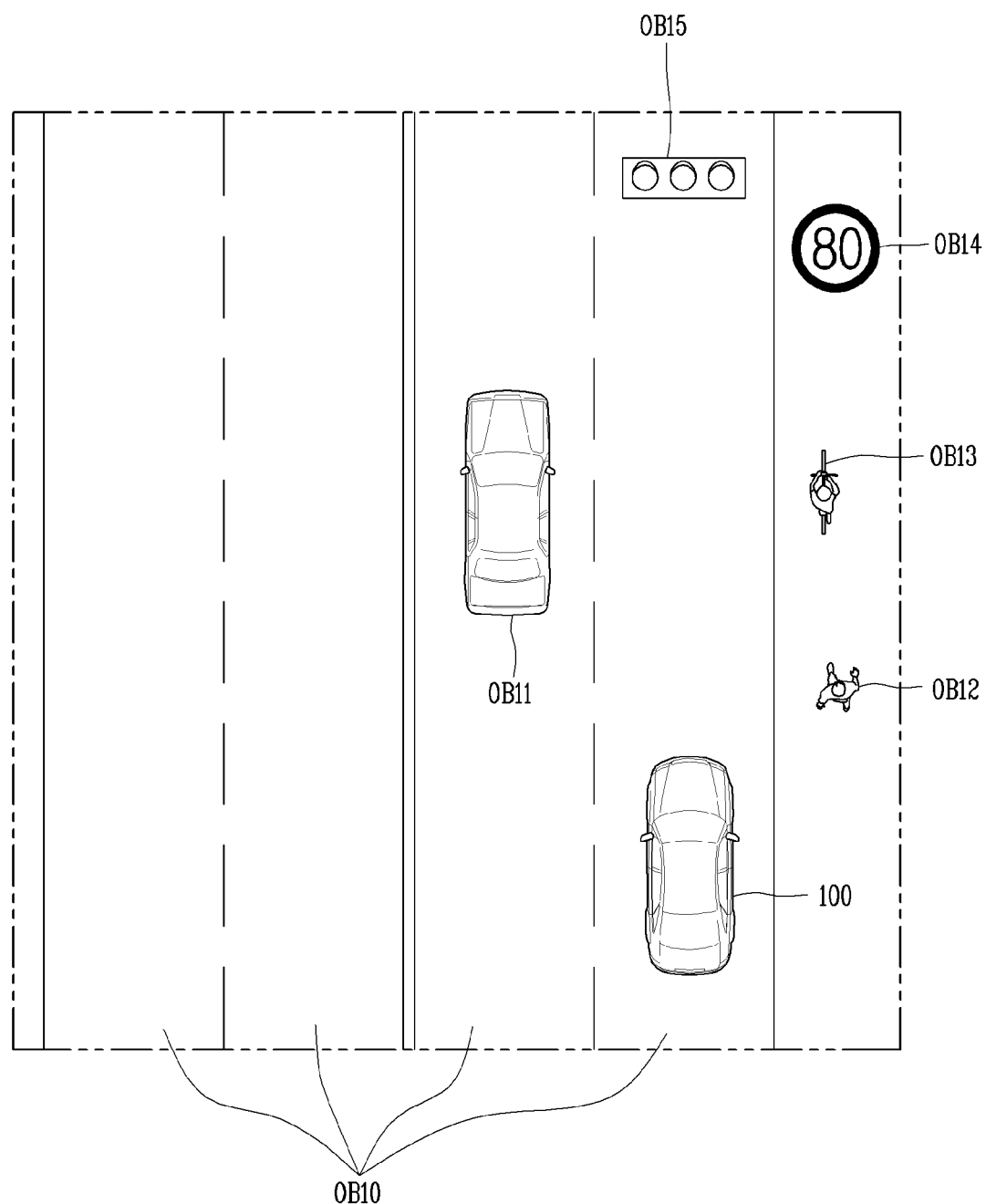
FIGS. 5 and 6 are reference views illustrating various objects in relation to traveling of the vehicle in accordance with the embodiment.
Figure 6:
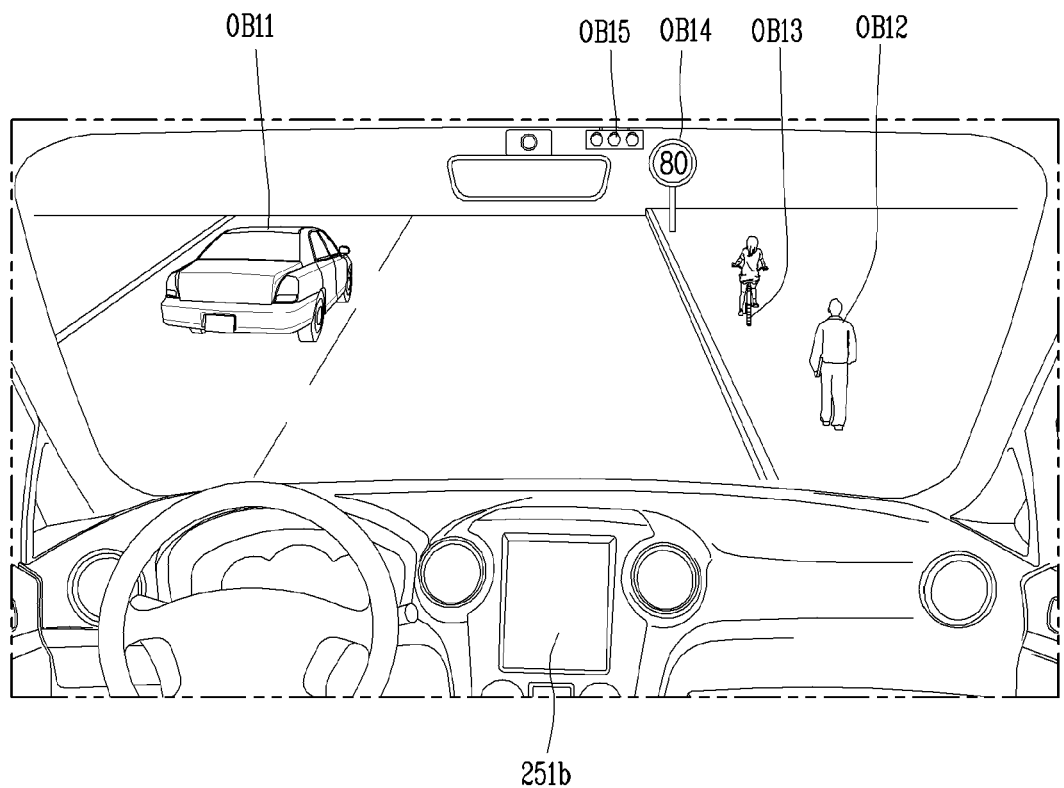

FIGS. 5 and 6 are reference views illustrating various objects in relation to traveling of the vehicle in accordance with the embodiment.

Figure 7:
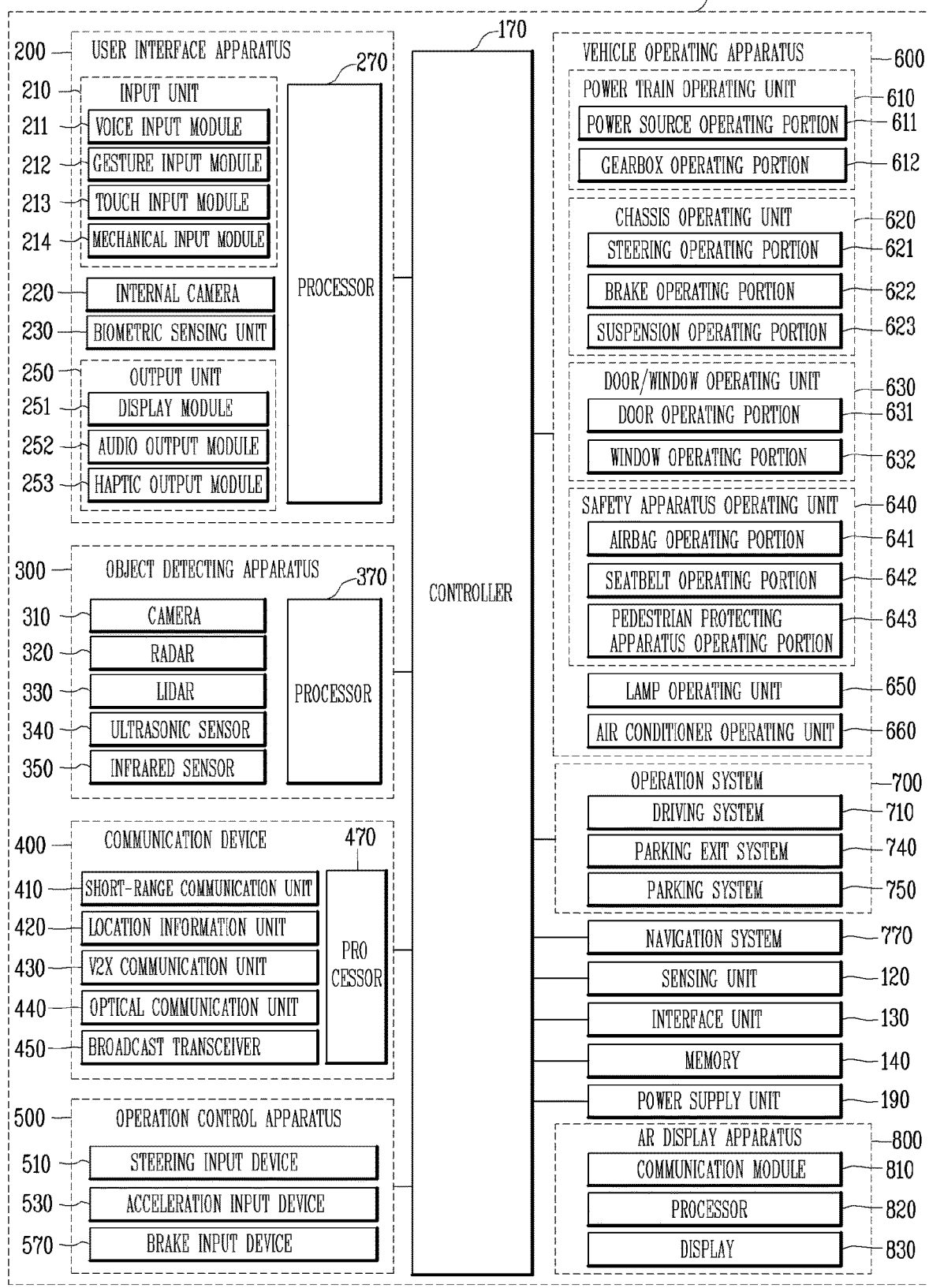
FIG. 7 is a block diagram illustrating a vehicle and an AR display device in accordance with an embodiment.

FIG. 7 is a block diagram illustrating the vehicle in accordance with the embodiment. FIG. 7 is a block diagram referred for explaining the vehicle according to the embodiment.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle. The vehicle 100 may be switched into an autonomous mode or a manual mode based on a user input. For example, the vehicle 100 may be converted from the manual mode into the autonomous mode or from the autonomous mode into the manual mode based on a user input received through a user interface apparatus 200 (hereinafter, referred to as 'user terminal').

The vehicle 100 may be switched into the autonomous mode or the manual mode based on driving environment information. The driving environment information may be generated based on object information provided from an object detecting apparatus 300. For example, the vehicle 100 may be switched from the manual mode into the autonomous mode or from the autonomous mode into the manual mode based on driving environment information generated in the object detecting apparatus 300. In an example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous mode into the manual mode based on information, data or signal provided from an external device.

When the vehicle 100 is driven in the autonomous mode, the autonomous vehicle 100 may be driven based on an operation system 700. For example, the autonomous vehicle 100 may be driven based on information, data or signals generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus (hereinafter, referred to as 'user terminal') 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus (hereinafter, referred to as 'user terminal') 200.

The user interface apparatus 200 may include an input unit 210, an internal camera 220, a biometric sensing unit 230, an output unit 250, and a processor 270. According to embodiments, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170. The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input. According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input. According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170. The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal. The output unit 250 may include at least one of a display module 251, an audio output module 252 and a haptic output module 253.

The display module 251 may output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window. The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 may convert an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user may recognize such output.

The processor (hereinafter, referred to as 'controller') 270 may control an overall operation of each unit of the user interface apparatus 200. According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle. The user interface apparatus 200 may operate according to the control of the controller 170.

The object detecting apparatus 300 is an apparatus for detecting an object located at outside of the vehicle 100. The object may be a variety of objects associated with driving (operation) of the vehicle 100. Referring to FIGS. 5 and 6, an object O may include a traffic lane OB10, another vehicle OB11, a pedestrian a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill, and the like.

Meanwhile, objects may be classified into a moving object and a fixed object. For example, the moving object may be a concept including another vehicle and a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350 and at least one processor, such as the processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill. For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCVV) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications may include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication device 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to an embodiment, the communication apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox. The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device. The chassis operating unit 620 may include a steering operating portion 621, a brake operating portion 622 and a suspension operating portion 623. The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road. Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk. The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protection apparatus operating portion 643 may perform an electronic control for a hood lift and a pedestrian airbag. For example, the pedestrian protection apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to an embodiment, the communication apparatus 700 may further include other components in addition to the components described, or may not include some of the components described.

Meanwhile, the operation system 700 may include a processor. Each unit of the operation system 700 may individually include at least one processor.

In some implementations, the operation system may be implemented by the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100. The driving system 710 may receive object information from the object detecting apparatus 300, transmit a control signal to the vehicle operating apparatus 600 and perform driving of the vehicle 100. The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot. The parking exit system 740 may receive object information from the object detection device 300, transmit a control signal to the vehicle operation device 600 and perform the exit of the vehicle 100 from the parking lot. The parking exit system 740 may receive a signal from an external device through the communication device 400, transmit a control signal to the vehicle operation device 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100. The parking system 750 may receive object information from the object detection device 300, transmit a control signal to the vehicle operation device 600 and park the vehicle 100. The parking system 750 may receive a signal from an external device through the communication device 400, transmit a control signal to the vehicle operation device 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a pose, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, an AR display device 800 according to the present disclosure may display an AR graphic interface indicating a driving state of the vehicle 100 on a front (or forward) image of the vehicle 100 (or a windshield of the vehicle) in real time through AR merging, on the basis of navigation information of the vehicle 100 and data received from an AR camera.

To this end, the AR display device 800 includes a communication module 810 for communicating with other devices/systems, servers, and vehicles, a processor 820 for controlling overall operations of the AR display device 800, and a display 830 for displaying a navigation screen including a front image upon which an AR graphic interface is rendered.

The communication module 810 may receive image data including a front image of the vehicle, location data including a current location of the vehicle, and map data of the vehicle including a map relating to the current location of the vehicle.

The term 'front image' or 'driving image' disclosed herein refers to an image captured through a camera sensor (or including smart glass having such a function) in a direction in which the vehicle is moving. This term may also refer to an image reflected on an LCD screen through the camera sensor, a real space image shown on a windshield/dashboard and/or a digital twin 3D image. The navigation screen may be an AR navigation screen to which an AR technology is applied.

In addition, the term 'AR graphic interface' disclosed herein is a graphic user interface to which an augmented reality (AR) technology is applied, and AR merging of the AR graphic interface is performed on a front image of a vehicle in real time.

The AR graphic interface in this disclosure may be an AR graphic image representing a current driving state of the vehicle. In addition, the AR graphic interface disclosed herein may be an AR graphic image that further indicates a guide for a driving situation of the vehicle simultaneously with the current driving to state of the vehicle. At this time, the guide for the driving situation of the vehicle is displayed on the front image of the vehicle at a predetermined distance and/or a predetermined time ahead of the corresponding driving situation.

Referring to FIG. 7, the AR display device 800 according to the embodiment of the present disclosure may be implemented as a part of an electrical component or system of the vehicle 100, or may be implemented as a separate independent device or system. Alternatively, the AR display device 800 may be implemented in the form of a program including instructions operated by a processor such as a user terminal of the vehicle 100 or the like.

The AR display device 800 may communicate with the vehicle 100, other devices, and/or servers to receive a front image of the vehicle acquired through an AR camera and sensing data acquired through sensors (e.g., a gyroscopic sensor, an acceleration sensor, a gravity sensor, a geomagnetic sensor, a temperature sensor, etc.) provided in the vehicle.

The AR display device 800 may operate a preset application, for example, an (AR) navigation application.

The AR display device 800 may render an AR graphic interface, which represents the current driving state of the vehicle based on map data (e.g., a map relating to a current location of the vehicle, route information, POI information, etc.) of the vehicle, sensing data, and a front image obtained by a camera, and provide the rendered AR graphic interface to an AR GUI surface and an AR camera surface of the navigation application in real time.

The AR display device 800 may render an AR object separated from the AR graphic interface to provide (indicate, display) a guide for a driving situation of the vehicle, based on the map data (e.g., the route information, the POI information, etc.), the sensing data, and the front image obtained by the camera, and provide the rendered AR object to the AR GUI surface and the AR camera surface of the navigation application in real time.

In this case, the separated AR object may be named 'second AR object', and the remaining part of the AR graphic interface after the second AR object is separated may be named 'first AR object'. That is, it can be said that the AR graphic interface includes the first AR object representing the current driving state of the vehicle and the second AR object displaying the guide for the driving situation of the vehicle.

Figure 8:
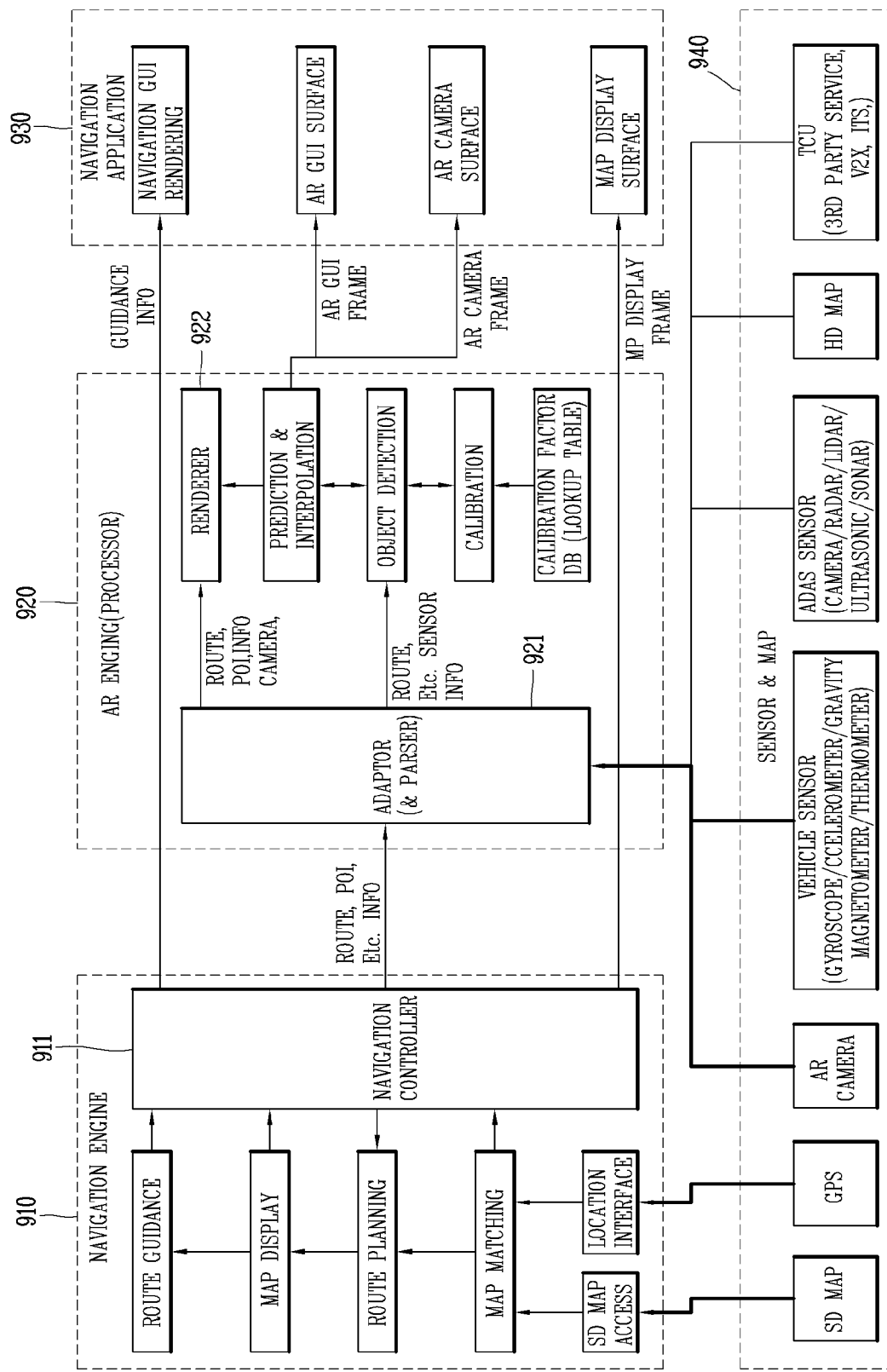
FIG. 8 is a detailed block diagram related to a processor of the AR display device in accordance with the embodiment.

Hereinafter, FIG. 8 is a detailed block diagram related to a processor 820 of the AR display device 800 in accordance with the embodiment.

The conceptual diagram illustrated in FIG. 8 may include a configuration related to operations performed by the processor 820 of the AR display device 800 and information, data, and programs used for the operations. In this aspect, the block diagram illustrated in FIG. 8 may also be used to mean a service provided through the processor 820 and/or a system executed/implemented by the processor 820. Hereinafter, for convenience of explanation, it will be referred to as the processor 820.

Figure 9:
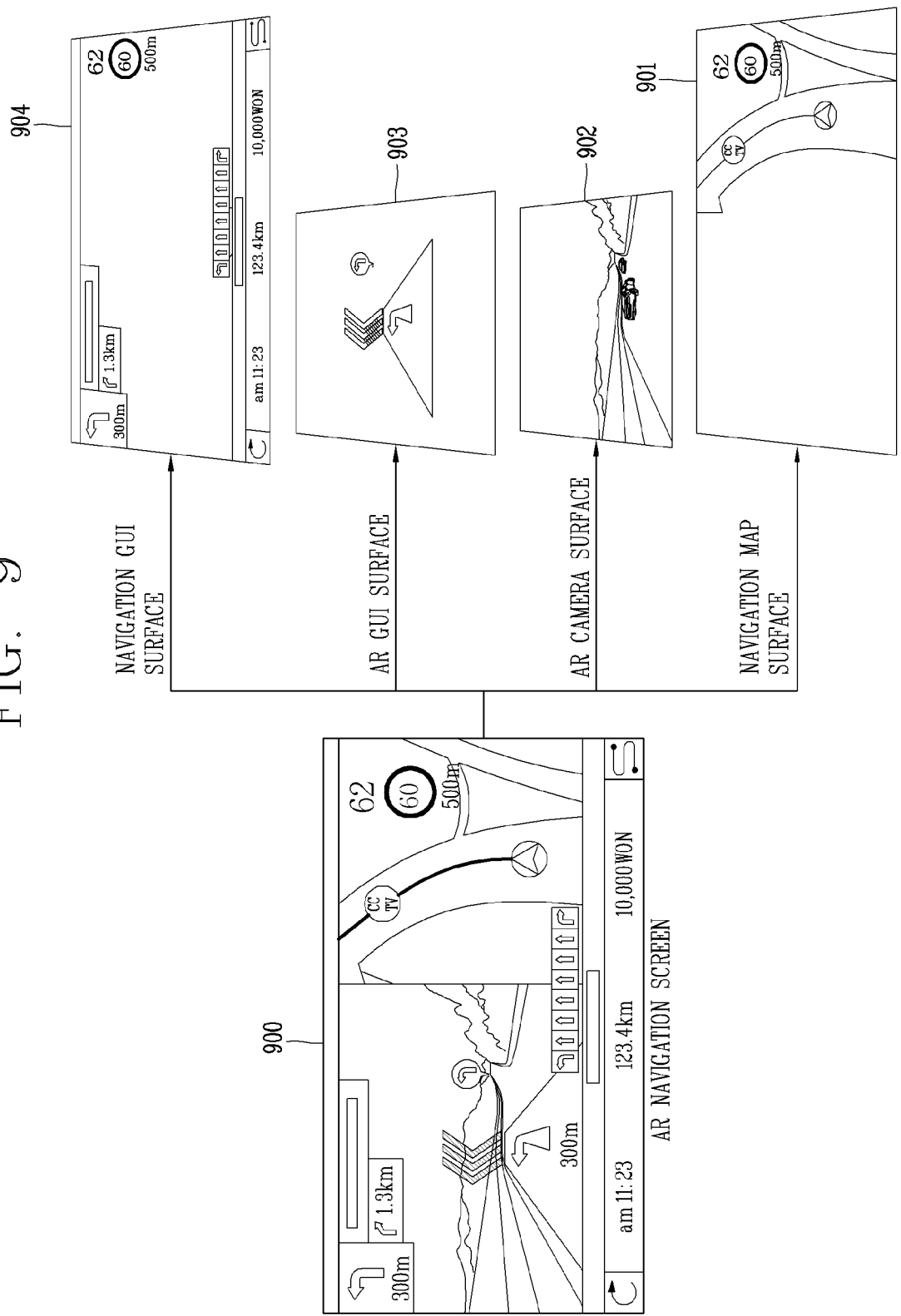
FIG. 9 is a diagram referenced to describe a navigation screen in accordance with an embodiment.
Figure 10:
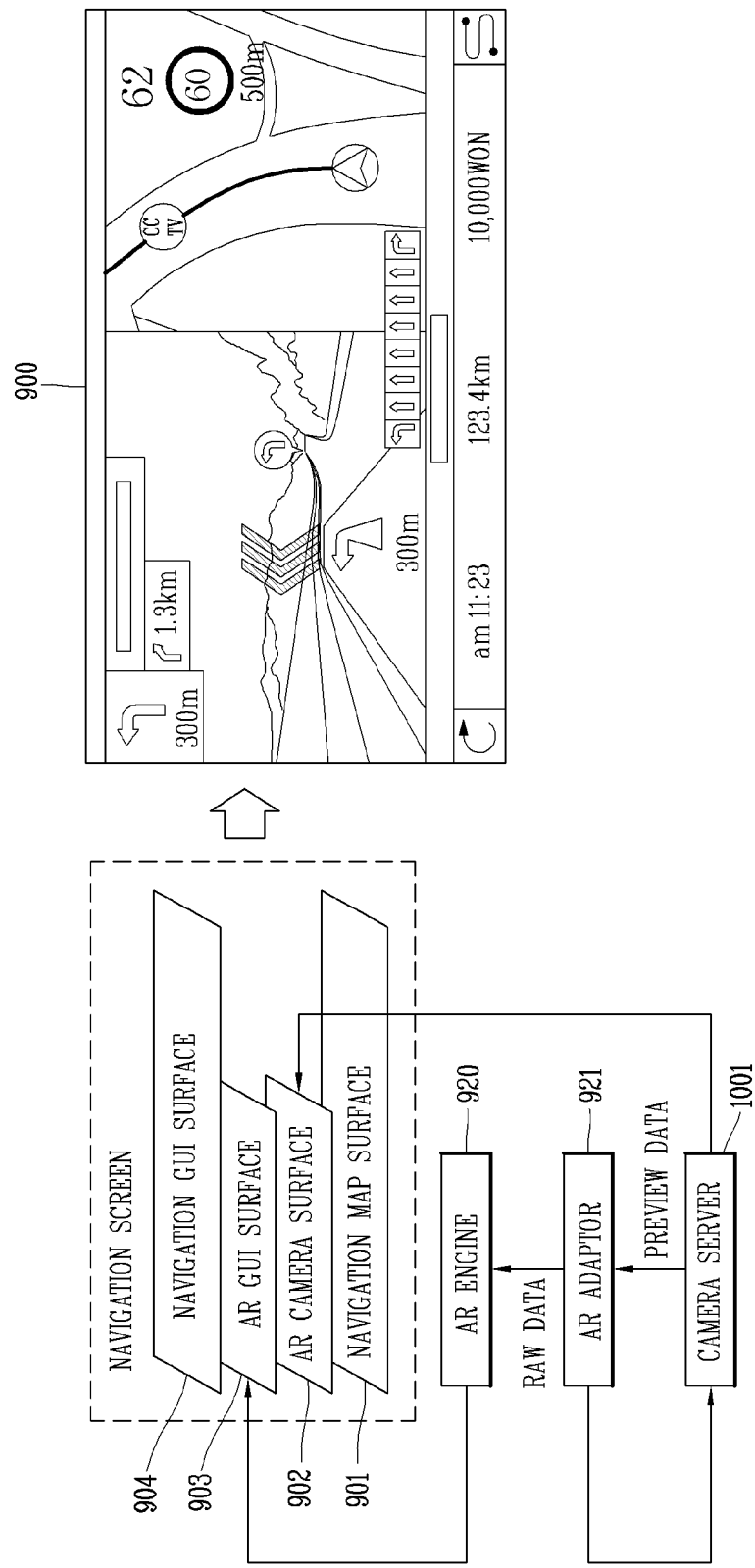
FIG. 10 is a diagram referenced to describe an operation of generating the navigation screen of FIG. 9.

FIG. 9 is a diagram referenced to describe a navigation screen in accordance with an embodiment, and FIG. 10 is a diagram referenced to describe an operation of generating the navigation screen of FIG. 9.

Referring to FIG. 8, the processor 820 may include a navigation engine 910, an augmented reality (AR) engine 920, a navigation application 930, and a sensor and map 940 or may interoperably drive such components.

The navigation engine 910 may receive map data and location data (e.g. GPS data) from a vehicle or the like. The navigation engine 910 may perform map matching based on the map data and the GPS data. The navigation engine 910 may perform route planning according to the map matching. The navigation engine 910 may display a map and perform route guidance. The navigation engine 910 may provide route guidance information to the navigation application 930.

The navigation engine 910 may include a navigation controller 911. The navigation controller 911 may receive map matching data, map display data, and route guidance data.

The navigation controller 911 may provide route data, point of interest (POI) data, and the like to the AR engine 920 based on the received map matching data, map display data, and route guidance data.

The navigation controller 911 may provide the route guidance data and a map display frame to the navigation application 930.

The AR engine 920 may include an adapter 921 and a renderer 922. The adapter 921 may receive front image data acquired from a camera (e.g., AR camera), and sensing data acquired from sensors of the vehicle, for example, gyroscopic sensor (Gyroscope), an accelerometer sensor (Accelerometer), a gravity sensor (Gravity), and a geomagnetic sensor (Magnetometer), and/or a temperature sensor (Thermometer).

The AR engine 920 may receive sensing data acquired from an ADAS sensor (e.g., camera, radar, lidar, ultrasound, or sonar). For example, the AR engine 920 may acquire driving-related sensing data, such as a driving direction and speed, a distance from a lane, and the like, as sensing data through the ADAS sensor.

The AR engine 920 may receive high-definition (HD) map data and a program related to the HD map data. Here, the high-definition map (HD Map) is a map for providing information related to detailed roads and surrounding terrains to an autonomous vehicle in advance, and has an accuracy within about 10 cm of an error range. The HD map also stores, in 3D digital form, traffic lights, signs, curbs, road marks, and various structures as well as lane-unit information such as road centerlines and boundary lines.

The AR engine 920 may receive acquired sensing data, received data, control data, and related programs from a Transmission Control Unit (TCU) (e.g., third party service, V2X, ITS communication, etc.).

The TCU of the sensor and map 940 is a communication control device mounted on the vehicle, and may perform communication with, for example, a vehicle to everything (V2X), which is a communication technology of communicating with various elements on roads for autonomous vehicles, (e.g. Collecting situational data through V2V and V2I), and Intelligent Transport Systems (ITS) or Cooperative Intelligent Transport Systems (C-ITS), which are cooperative intelligent transport system technologies.

The AR engine 920 may perform calibration on a front image based on data provided from a calibration factor database (DB). The AR engine 920 may perform object detection based on front image data and route data. The AR engine 920 may perform prediction and interpolation based on the detected object.

The renderer 922 may perform rendering based on the route data, the POI data, and result data of the prediction and interpolation. The renderer 922 may provide an AR graphical user interface (GUI) frame and an AR camera frame to the navigation application 930.

The navigation application 930 may generate an AR navigation screen 900.

According to the embodiment of FIG. 8, the processor 820 of the AR display device 800 includes the navigation engine 910, the AR engine 920 and the navigation application 930. Alternatively, the processor 820 may include the AR engine 920 only. In other words, the AR engine 920 only may be executed by the processor 820, and the navigation engine 910 and the navigation application 930 may be executed by one or more processors outside the AR display device 800. Further alternatively, even the AR engine 920 also may be executed by one or more processors outside the AR display device 800. In this alternative scene, the AR display device 800 may only perform receiving rendered images and displaying them on the display 830. If necessary, the AR display device 800 may convert the rendered images suitably for a form factor of the AR display device 800 or decrypt the encrypted rendered images.

Referring to FIG. 9, the AR navigation screen 900 may include a navigation map surface 901, an AR camera surface 902, an AR GUI surface 903, and a navigation GUI surface 904.

The navigation application 930 may create the navigation map surface 901 based on the map display frame provided from the navigation controller 911. The navigation application 930 may create the AR camera surface 902 based on the AR camera frame provided from the renderer 922. The navigation application 930 may create the AR GUI surface 903 based on the AR GUI frame provided from the renderer 922. The navigation application 930 may generate the navigation GUI surface 904 based on the route guidance data provided from the navigation controller 911.

Referring to FIGS. 8 and 10 together, when the navigation application 930 is driven, the navigation application 930 may generate the navigation map surface 901, the AR camera surface 902, the AR GUI surface 903, and the navigation GUI surface 904.

The navigation application 930 may provide parameters of the AR camera surface 902 and parameters of the AR GUI surface 903 to the AR engine 920.

The AR engine 920 may register a callback function to receive front image data from a camera server 1001. The camera server 1001 may be understood as a concept included in a memory of the AR display device 800, for example.

The AR engine 920 may receive and crop the front image data. Cropping may include adjusting a size or position of an image, editing a partial region, adjusting transparency, and the like. The navigation application 930 may display the cropped front image on the AR camera surface 902. The AR engine 920 may perform AR merging in real time. Also, the navigation application 930 may display an AR GUI on the AR GUI surface 903 based on the cropped front image.

Figure 11:
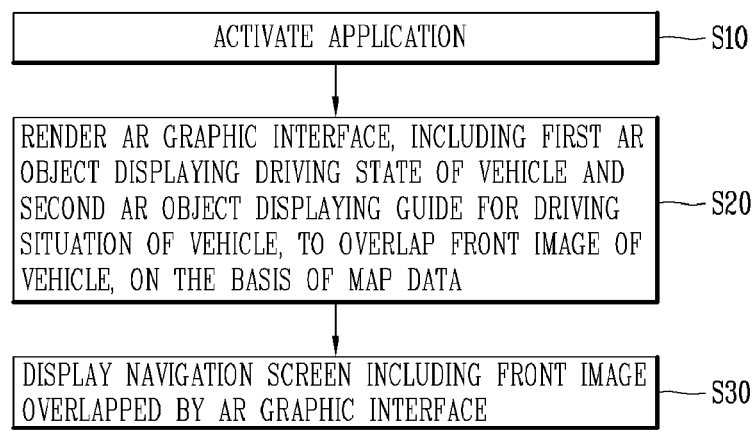
FIG. 11 is a flowchart referenced to describe a method for displaying an AR graphic interface on the navigation screen in accordance with the embodiment.

FIG. 11 is a flowchart referenced to describe a method 1100 for displaying an AR graphic interface on the navigation screen in accordance with the embodiment.

Each process of FIG. 11 may be performed by a processor (or the AR engine) unless otherwise noted. In addition, the processes of FIG. 11 may be performed by including the operations of the navigation engine 910, the AR engine 920, and the navigation application 930 by the processor 820 described above with reference to FIGS. 8 to 10, or at least some of the operations may be performed before or after the processes of FIG. 11.

Referring to FIG. 11, the method starts by activating a preset application (S10).

The preset application may be pre-installed on the AR display device 800 or may be driven by another device/server cooperating therewith, for example, in response to an execution of an AR mode of the vehicle. The preset application is may be, for example, a navigation application executed in the AR mode during the driving of the vehicle.

The navigation application, for example, receives the route guidance and the map display frame based on the map data and the GPS data from the navigation engine, and generates navigation GUI rendering and a map display surface, respectively.

In addition, the navigation application, for example, generates an AR GUI surface by receiving an AR GUI frame from the AR engine, and generates an AR camera surface by receiving an AR camera frame. The navigation application renders the generated map display surface, AR camera surface, and AR GUI surface to the navigation GUI surface.

The processor generates an AR graphic interface, which includes a first AR object displaying (outputting, indicating, providing) a driving state of the vehicle of the vehicle, and a second AR object indicating a guide for a driving situation of the vehicle, on the basis of map data acquired from a server, memory, or vehicle and sensing data of the vehicle, and renders the generated AR graphic interface to overlap a front image of the vehicle (S20).

The processor may perform AR merging of the AR graphic interface generated in real time with the front image of the vehicle in real time.

The processor displays (renders) the AR graphic interface in a state in which the first and second AR objects are combined. When a preset condition is satisfied, the processor displays (renders) the AR graphic interface in a state in which the second AR object is separated from the AR graphic interface.

Here, the preset condition may include a case where a change in the driving situation of the vehicle is predicted from a current driving state based on the sensing data of the vehicle. The preset condition may include a case where a change in the driving situation of the vehicle or a situation in which a need for guidance is predicted is detected based on at least one of ADAS sensing data, high-definition map data, and TCU communication data such as V2X, ITS, and C-ITS.

Then, the processor displays the navigation screen including the front image overlapped by the AR graphic interface (S30).

The processor may render the AR graphic interface on the front image in a state in which the first and second AR objects are combined. The processor may generate the AR GUI surface and the AR camera surface, respectively, by providing the AR GUI frame and the AR camera frame corresponding to the AR graphic interface to the navigation application.

Thereafter, the generated AR GUI surface and AR camera surface are rendered on the navigation GUI surface, so that the front image with the rendered AR graphic interface is included in (displayed on) the navigation screen.

Meanwhile, the AR graphic interface may vary depending on a driving situation that is predicted to change based on the map data and the sensing data of the vehicle.

At this time, the AR graphic interface that varies is displayed with the plurality of AR objects separated, to provide a driver of the vehicle with intuitive guidance for the current driving state and the driving situation that is predicted to change.

Figure 12A:
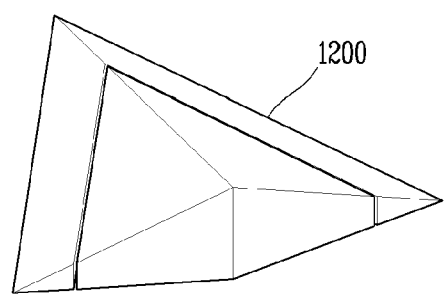
FIGS. 12A and 12B are diagrams illustrating an example of the AR graphic interface according to the embodiment of the present disclosure, which are referenced to describe separation and combination of first and second AR objects.
Figure 12B:
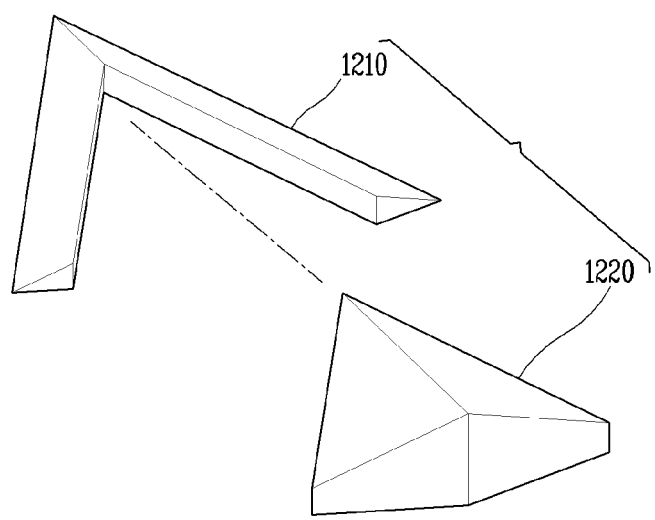

FIGS. 12A and 12B are diagrams illustrating an example of the AR graphic interface according to the embodiment of the present disclosure, which are referenced to describe separation and combination of first and second AR objects based on a predicted change in driving situation.

Referring to the drawings, an AR graphic interface 1200 may be implemented as an AR image of a specific shape in a 3D form, and the AR image may be used to indicate road information, and the like in addition to a current driving direction, a driving speed, and steering information of the vehicle. The AR graphic interface 1200 may be implemented in the form in which a first object and a second object are combined with each other.

Here, the first object may be implemented in the form of, for example, a 3D spade (e.g., a shovel-shaped image), and the second object may be implemented in the form of a 3D chevron (e.g., A or V-shaped image) extending from the first object. However, this does not mean that the first and second objects are limited to these shapes.

The first object and the second object of the AR graphic interface 1200 may be combined such that an inner frame of the second object and an outer frame of the first object extend to be in contact with each other. In this case, the first and second objects may be expressed in different colors so as to be visually distinguishable from each other.

The AR graphic interface 1200 may be rendered such that the first and second objects move at the same distorted angle or different distorted angles in a combined state, to indicate the current driving state of the vehicle.

The generated AR graphic interface 1200 is displayed to overlap the front image of the vehicle included in the navigation screen. Specifically, the processor 820 generates the AR graphic interface 1200 indicating the current driving state of the vehicle based on the map data and the sensing data of the vehicle, renders the AR graphic interface 1200 based on route, POI information, etc., and sends the rendered AR graphic interface 1200 to the navigation application 930. Accordingly, the AR graphic interface 1200 is displayed to overlap the front image of the vehicle included in the navigation screen.

Referring to FIG. 12B, the processor 820 may separate the first and second AR objects 1210 and 1220 of the AR graphic interface based on a driving situation that is predicted to change based on the map data and the sensing data of the vehicle, render the separated second AR object 1210 to display guidance related to the changed driving situation, and update the AR GUI surface and the AR camera surface of the navigation application 930.

The condition in which the first and second AR objects 1210 and 1220 are separated may include a case where a change in driving situation of the vehicle is predicted from the current driving state of the vehicle based on the sensing data of the vehicle.

Alternatively, the condition in which the first and second AR objects 1210 and 1220 are separated may include a case where it is detected that a driving situation of the vehicle is predicted to change from a current driving state of the vehicle or to be necessarily guided based on at least one of ADAS sensing data, high-definition map data, and TCU communication data such as V2X, ITS, and C-ITS.

Meanwhile, the separated second AR object 1210 is displayed by extending from a display position of the first AR object 1220. Since the first AR object 1220 indicates the current driving state of the vehicle (e.g., the current location and driving direction of the vehicle), the driver can intuitively determine a time point and a driving direction to drive the vehicle according to the guidance indicated by the second AR object 1210.

A spaced distance between the first and second AR objects 1210 and 1220 may correspond to a time point or distance at which the driving situation of the vehicle is predicted to change.

Also, although not illustrated in detail, the separated second AR object 1210 may be implemented by a plurality of fragments. A predetermined interval may be maintained between the plurality of fragments.

In addition, a direction indicated by each of the plurality of fragments may gradually point to a predicted situation occurrence location (or situation end location). For example, if the separated second AR object 1210 is implemented by a total of 5 fragments, each of the 5 fragments may point to the same location (e.g., a predicted situation occurrence location) at different distorted angles.

The plurality of fragments may be expressed in the form of moving a specific distance ahead of the first AR object 1220. That is, the plurality of fragments does not fixedly appear at a specific location or time point but are implemented to provide driving guidance according to a driving situation predicted during movement on the basis of the current location and driving state of the vehicle.

A moving speed of the plurality of fragments may correspond to a degree (e.g., driving speed) that the vehicle approaches closely.

Also, the number and/or display length of the plurality of fragments may be proportional to a time or distance that a predicted situation continues. For example, a larger number of fragments may be included or a total display length may be longer in the case where the situation continues for a long time than that in the case where the situation does not continue for a long time.

A fragment, which is close to the first AR object 1220 among the plurality of fragments, displays a guide to be associated with the driving state indicated by the first AR object 1220.

A fragment, which is farthest away from the first AR object 1220 among the plurality of fragments, displays a guide to be associated with a predicted situation.

That is, the plurality of fragments of the separated second AR object 1210 provides a guide for a situation, which is predicted from the current driving state corresponding to the first AR object 1220, in a more gradual and seamless manner.

When the situation corresponding to the condition that the second AR object 1210 is separated ends, the separated second AR object 1210 is then displayed back in the combined state with the first AR object 1220. That is, the AR graphic interface 1200 as illustrated in FIG. 12A may be displayed again.

The term 'combined state' in the present description means that the first and second AR objects are connected to each other on the screen, or the two AR objects are put relatively closer to each other on the screen than the 'separated state' where the two AR objects are separated from each other. Similarly, the meaning of the expression 'joining the first and second AR objects to each other' in the present description comprises not only connecting the first and second AR objects to each other but also putting the first and second AR objects close together with a relatively smaller gap between them than a case of 'separating the second AR object from the first AR object'.

Hereinafter, the AR display device 800 according to the present disclosure may receive map data of the vehicle, state data of the vehicle, and network data, estimates a context that may occur while the vehicle is traveling based on those received data, and display driving guide information related to the context by varying an AR graphic interface.

Figure 13:
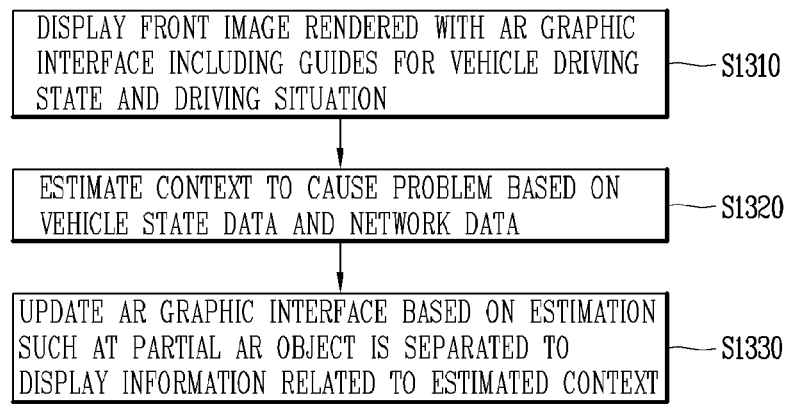
FIG. 13 is a flowchart referenced to explain a method of estimating a context based on network data and displaying related guide information through an AR graphic interface according to an embodiment of the present disclosure.

FIG. 13 is a flowchart referenced to explain a method of estimating a context based on network data and displaying related guide information through an AR graphic interface according to an embodiment of the present disclosure.

Each step illustrated in FIG. 13 is performed by the processor 820 of the AR display device 800 unless otherwise noted. In this disclosure, the processor 820 may be used to include or refer to the AR engine 920.

In addition, the processor 820 provides a related AR GUI frame to the navigation application 930 to update an AR GUI surface in real time, in order to render an AR graphic interface in a separated, deformed, and combined form in real time on a front image.

Referring to FIG. 13, the processor 820 may display on a navigation screen a front image rendered with an AR graphic interface which includes guides for a current driving state of the vehicle and a driving situation of the vehicle (S1310).

As described above, the AR graphic interface includes first and second AR objects. In this case, the first AR object displays the current driving state of the vehicle, and the second AR object is combined with or separated from the first AR object to display a guide for a driving situation that is predicted during to driving of the vehicle.

While the vehicle is traveling, the processor 820 may estimate a context in which a problem may occur based on state data of the vehicle (and/or map data, sensing data) and network data corresponding to an external resource (S1320).

Here, the context in which a problem may occur refers to a worried situation related to driving and/or safety of the vehicle, and a next (subsequent) driving situation predicted in a current driving situation.

For example, examples of the context in which a problem may occur may include a detection of and possibility of collision with a hidden obstacle which is not visible in the front image of the vehicle, a route to be followed and a possibility of collision due to a selection of a vehicle in front to be followed, diagnostic prediction and determination of driving prohibition based on the state of the vehicle, congestion and a possibility of detouring of a current driving route, and a detection of a charging allowable area due to the vehicle entering a charging station.

In addition, the network data is communication data based on external resources, for example, may include data related to third-party services received while the vehicle travels, data related to an intelligent transportation system (ITS), V2V/V2X communication data, data received from a control server, and other external service data.

Subsequently, when the context is estimated, the processor 820 separates a partial AR object of the AR graphic interface, namely, the second AR object for guiding a predicted driving situation from a first AR object, and updates the separated second AR object to display information related to the estimated to context (S1330).

Here, the information related to the context, for example, vehicle driving information related to the context, may include additional information related to the context.

According to an embodiment, the processor 820 may render the AR graphic interface such that the second AR object separated from the first AR object is displayed at a location associated with an occurrence of the estimated context while the first AR object keeps displaying the current driving state of the vehicle.

In addition, according to an embodiment, the processor 820 may determine whether to include additional information in the second AR object, based on a separation distance between the context occurrence location displayed by the separated second AR object and the current location of the vehicle corresponding to the first AR object. The processor 820 may then update the second AR object based on the determination.

For example, when the current location of the vehicle is more than a predetermined distance away from the context occurrence location, the processor 820 may determine that the additional information related to the context is not included in the second AR object. Also, for example, when it is recognized that the current location of the vehicle has approached the context occurrence location within a predetermined distance, the processor 820 may render the separated second AR object to include the additional information related to the context.

Here, the additional information refers to information (e.g., situation description, alarm, guidance route, proposed driving control operation, etc.) related to an operation reacting with the estimated context.

For example, a warning about a hidden obstacle, a change in driving speed or driving direction of a vehicle in front to be followed, inspection, charging, route guidance in a parking area, guidance for congestion-related information and detour route, charging status, and charge rate information may be included as the additional information related to the context.

As described above, in the AR display device according to the present disclosure, the context to possibly occur can be estimated by additionally considering external resources such as network data in addition to the sensing data of the vehicle and the map data, which can result in providing an intuitive UX for more diverse driving situations that are predicted during driving.

Hereinafter, various UXs provided for each situation in which a problem may occur using the AR graphic interface will be described in more detail.

Figure 14:
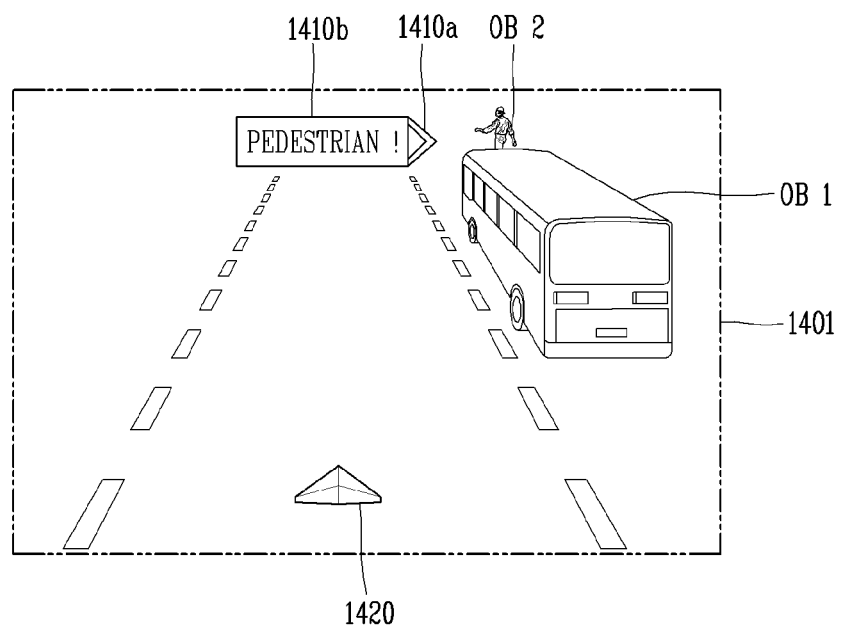
FIG. 14 is a conceptual view illustrating an AR graphic interface that displays related guide information according to a detection of and a possibility of collision with a hidden obstacle according to an embodiment of the present disclosure.

FIG. 14 is a conceptual view illustrating an AR graphic interface that displays related guide information according to a detection of and a possibility of collision with a hidden obstacle according to an embodiment of the present disclosure.

The processor 820 of the AR display device 800 may combine network data obtained from an external resource with at least one of map data, vehicle sensing data, and location data to determine whether to detect a context to occur.

According to an embodiment, the processor 820 may receive, for example, ADAS sensing data, vehicle sensing data (e.g., CAN data), map data such as navigation/map/GPS data, and external service data.

The processor 820 may periodically detect whether a hidden obstacle exists in a hidden area adjacent to the vehicle (or a driving lane) based on the ADAS sensing data or the external service data. In addition, the processor 820 may periodically determine a possibility of collision with the vehicle when a hidden obstacle is detected.

Based on a result of the determination, the processor 820 may display on the front image at least one of location information and situation information corresponding to the corresponding context (the detection of the hidden obstacle in the hidden area) through the separated second AR object.

Referring to FIG. 14, in a front image 1401 of the vehicle, a second object OB2 obscured by a first object OB1 may be detected as a hidden obstacle based on ADAS sensing data or external service data.

In this case, since the second object OB2 is not visible in the front image 1401 and its movement cannot be checked because it is obscured by the first object OB1 (e.g., a bus), there is a possibility of collision between the second object OB2 and the vehicle traveling straight ahead.

Accordingly, when the second object OB2 is recognized as the hidden obstacle, the processor 820 updates the AR graphic interface such a first AR object 1420 keeps displaying the current driving state (e.g., traveling straight ahead) and the separated second AR object moves to a predicted location of the second object OB2.

A rotation animation effect may be output so that the second AR object that has moved to the predicted location of the second object OB2 points to the predicted location of the hidden second object OB2. In addition, context-related information, for example, 'Pedestrian!' may be displayed in the form of text or image adjacent to the rotated second AR object 1410*a*.

In this case, a UX 1410*b* including the context-related information may be displayed by varying the second AR object or using a separate third AR object.

According to an embodiment, a notification level by the UX 1410*b* may be varied to correspond to a degree of collision possibility between the vehicle and the hidden obstacle.

The degree of collision probability between the vehicle and the hidden obstacle may be calculated/estimated by applying a weight according to a separation distance between the predicted location of the hidden obstacle and the current location of the vehicle and/or a comparison of before and after values of ADAS sensing data or external service data.

On the other hand, when the second object OB2, which is the hidden obstacle, disappears from the front image 1401 and/or there is no possibility of collision with the vehicle (e.g., a movement direction changed), the separated second AR object is moved to the first AR object 1420 and combined with the first AR object 1420 (at this time, the third AR object disappears). That is, when the situation corresponding to the context ends, the AR graphic interface is updated into the combined form of the first and second AR objects.

Figure 15:
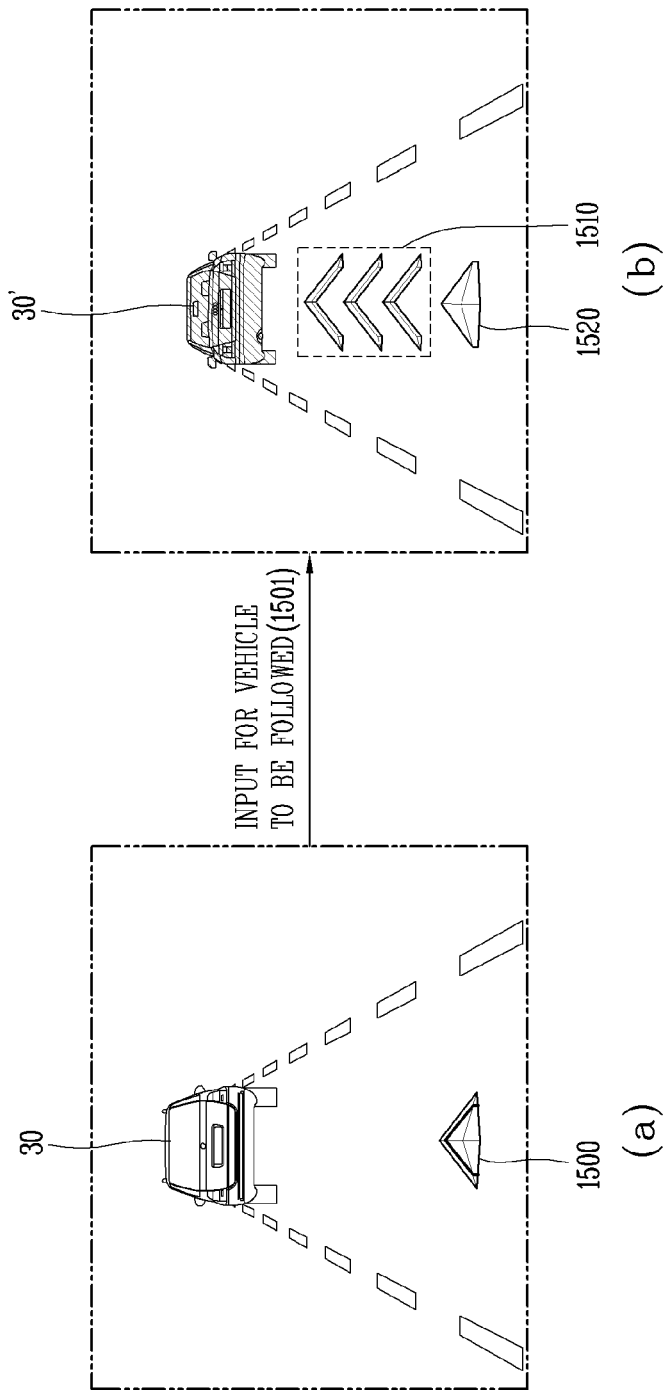

FIGS. 15 and 16 are conceptual views illustrating various modified examples of an AR graphic interface for displaying guide information according to setting of a vehicle to be followed according to an embodiment of the present disclosure.

The processor 820 may determine a detection of a context to occur by combining network data, which is an external resource, with at least one of map data, vehicle sensing data, and location data, and display at least one of location information and situation information corresponding to the context through the separated second AR object.

In this case, the at least one of the location information and the situation information may be displayed in association with the current driving state of the vehicle corresponding to the first AR object.

Referring to (a) of FIG. 15, while an AR graphic interface 1500 indicating a driving state of the vehicle is provided on a front image of the vehicle (a), an input for a vehicle to be followed (hereinafter, also referred to as a followed vehicle input) (1501) may be performed with respect to one of preceding vehicles through an input from the vehicle or the AR display device 800.

According to the followed vehicle input 1501, the vehicle now travels while following the preceding vehicle, which provides convenience to the driver. Furthermore, in the present disclosure, a UX is provided for intuition of which vehicle is followed by the vehicle and what driving control is necessary in consideration of the possibility of collision with the vehicle to be followed.

According to an embodiment, the second AR object is deformed to include a plurality of fragments when separated.

Among the plurality of fragments, a fragment close to the first AR object is closely associated with a state (e.g., direction and rotational angle) of the first AR object indicating the current driving state of the vehicle, and points toward location and direction corresponding to the context as it is getting away from the first AR object.

In other words, it can be said that the separated second AR object points to the location of the vehicle to be followed or moves to that location.

The processor 820 may vary the separated second AR object such that the plurality of fragments displays a plurality of trajectories drawn from the first AR object toward a position of an object corresponding to the context.

The processor 820 provides the navigation application 930 with an AR GUI frame updated based on the information related to the second AR object varied as described above, so that an AR GUI surface can be updated in real time, thereby providing a more complete and intuitive AR interface.

Continuously referring to (b) of FIG. 15, in response to the followed vehicle input 1501, the followed vehicle 30 is changed to a selection-marked followed vehicle 30', and the AR graphic interface is displayed in the separated form.

The separated second AR object 1510 is displayed in the form of a plurality of guide trajectories connecting the location of the first AR object (i.e., the current location of the vehicle) and the location of the followed vehicle 30' while the first AR object 1520 indicates the current driving state of the vehicle.

A length of the plurality of guide trajectories indicates a driving distance to be followed by which the vehicle should follow the followed vehicle 30. Therefore, the length of the plurality of guide trajectories decrease as the vehicle approaches the followed vehicle 30, while increasing as the vehicle is away from the followed vehicle 30.

Since it is desirable to maintain the driving distance to be followed between the vehicle and the followed vehicle 30 within a predetermined distance, the traveling speed should decrease when the length of the plurality of guide trajectories is too short, while increasing when the length of the plurality of guide trajectories is too long. In this regard, a preferable driving distance to be followed may also be displayed by the separated second AR object 1510 or a notification notifying that the driving distance to be followed has reached a threshold value may be displayed, thereby assisting following driving.

Meanwhile, the plurality of (guide) trajectories constituting the separated second AR object may include a driving guide related to a next (subsequent) driving state of the vehicle that is predicted based on a moving state of the object corresponding to the context.

That is, while the first AR object indicates the current driving state of the vehicle, the separated second AR object may indicate the location and driving state of the followed vehicle.

Referring to (a) of FIG. 16, when the selection-marked followed vehicle 30' is speeding, this is determined based on at least one of ADAS sensing data, vehicle sensing data (e.g., CAN data), navigation/map/GPS data, and external service data that are received by the processor 820.

The processor 820 updates the second AR object 1510S, which displays the speeding followed vehicle 30' and the plurality of guide trajectories, to indicate an acceleration of the followed vehicle 30', for example, to output a notification color (e.g., an orange-based color or a red color) on the followed vehicle 30' and the plurality of (guide) trajectories.

The driver may drive the vehicle by increasing the driving speed so as not to get away from the followed vehicle 30' while checking the varied second AR object. (Alternatively, a signal may be transmitted to the driver of the followed vehicle 30' to slow down the driving speed.) Then, when the separation distance between the followed vehicle 30' and the vehicle is maintained within a predetermined distance and/or the driving speed of the followed vehicle 30' is reduced, the notification color output on the followed vehicle 30' and the second AR object 1510S is restored to an original color.

On the other hand, when it is determined that both the vehicle 100 and the followed vehicle 30' are speeding based on ADAS sensing data, vehicle sensing data (e.g., CAN data), navigation/map/GPS data, and external service data, the processor 820 may indicate the speeding state of the vehicle through a color change of the first AR object, and the speeding state of the followed vehicle 30' through a color change of the separated second AR object as described above.

Continuously, (b) of FIG. 16 illustrates a plurality of guide trajectories when the followed vehicle 30' changes a lane.

When the followed vehicle 30' changes a lane to avoid a preceding vehicle (e.g., changes to a right lane), the plurality of guide trajectories is displayed to connect the location of the first AR object and the location of the followed vehicle that has changed the lane.

Figure 17:
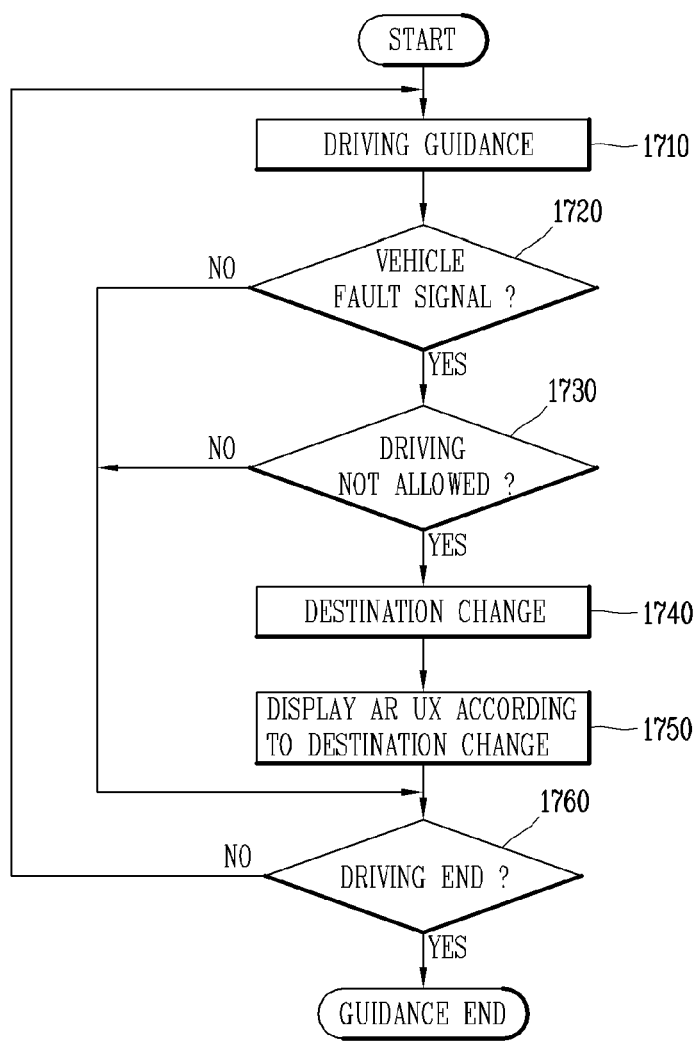
FIGS. 17, 18A, and 18B are a flowchart and conceptual views referenced to describe a method of displaying a countermeasure with respect to a vehicle state diagnosis through an AR graphic interface according to an embodiment of the present disclosure.
Figure 18A:
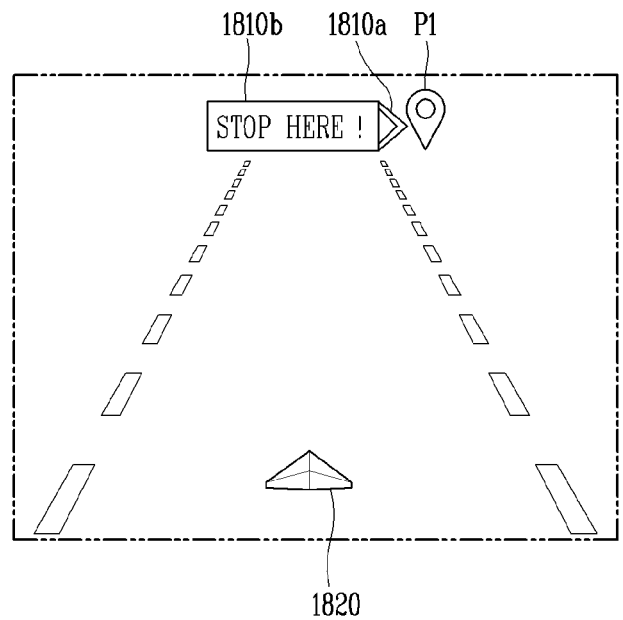
Figure 18B:
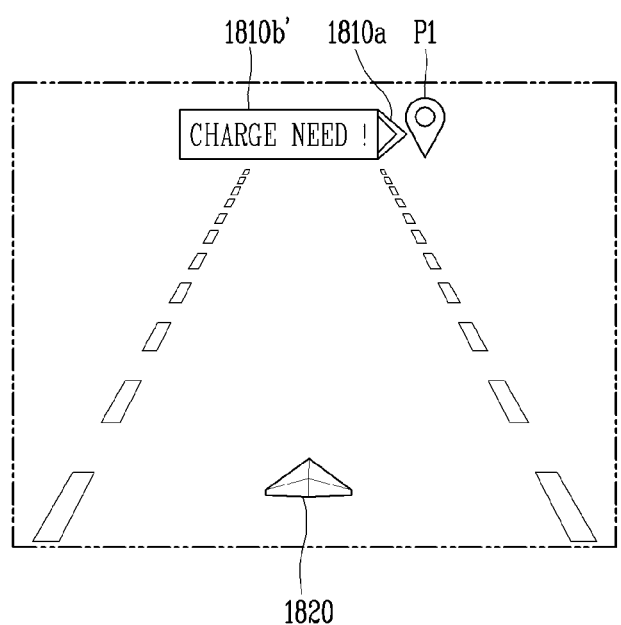

FIGS. 17, 18A, and 18B are a flowchart and conceptual views referenced to describe a method of displaying a countermeasure with respect to a vehicle state diagnosis through an AR graphic interface according to an embodiment of the present disclosure.

The AR display device 800 may inspect a condition (status) of the vehicle based on ADAS sensing data, vehicle sensing data (e.g., CAN data), navigation/map/GPS data, and external service data received while the vehicle is driving, and provide customized POI information through an AR graphic interface according to a result of the condition inspection of the vehicle.

Referring to the flowchart of FIG. 17, while guiding the driving of the vehicle through the AR graphic interface (1710), the processor 820 may detect a vehicle fault signal based on ADAS sensing data, vehicle sensing data (e.g., CAN data), navigation/map/GPS data, and external service data that are received in real time/periodically (1720)

The vehicle fault signal includes, for example, an abnormal (or fault) signal corresponding to an abnormality in a component of the vehicle, a battery state (e.g., low battery), and a fueling state (e.g., low fuel gauge).

Upon detecting the vehicle fault signal, the processor 820 determines whether the vehicle cannot be driven (1730). When the vehicle can be driven according to the determination (1730), only a notification is displayed and driving toward a destination set in a navigator is continued.

When the vehicle cannot be driven according to the determination (1730), the destination is changed to a location which is suitable for the condition of the vehicle corresponding to the vehicle fault signal (1740).

The location suitable for the condition of the vehicle means a place where the fault state of the vehicle according to the result of the condition inspection of the vehicle can be resolved. For example, as the result of the inspection, a repair shop POI may be determined as a suitable place upon a component failure of the vehicle, a charging station POI when the battery is low, and a gas station POI when the fuel gauge is insufficient.

The processor 820 may set a new destination based on the determined place, the current location of the vehicle, and a POI history (e.g., a repair shop frequently visited), and guides the newly-set destination using the separated second AR object.

The processor 820 varies the AR graphic interface according to the destination change and displays the varied AR graphic interface (1750). That is, a route guidance to the changed destination is performed through the AR graphic interface. The processes may be repeated until it is determined that the driving to ends (1760), and when the driving is finished, a guidance process according to the vehicle condition inspection ends.

FIG. 18A illustrates a case where an emergency is determined according to a vehicle inspection based on ADAS sensing data, vehicle sensing data (e.g., CAN data), navigation/map/GPS data, and external service data while the vehicle is driving.

When it is impossible to continuously drive the vehicle according to the determination of the emergency, the processor 820 sets an adjacent parking allowable area, which is suitable for the condition of the vehicle, as a new destination P1. At this time, a previously set destination is canceled. Thereafter, while the first AR object 1820 displays the current driving state of the vehicle, the separated second AR object guides the new destination P1 through a plurality of fragments.

At this time, the reason for changing to the new destination P1 and warning notification information may be output together through the separated second AR object.

When the location of the vehicle (or the location of the first AR object) approaches the new destination P1 within a predetermined distance, the separated second AR object moves to the location of the new destination P1. The moved second AR object 1810a is displayed along with additional information 1810b (e.g., 'Stop here!') suggesting parking and stopping of the vehicle.

FIG. 18B illustrates a case where a low battery condition is determined according to a vehicle inspection based on ADAS sensing data, vehicle sensing data (e.g., CAN data), navigation/map/GPS data, and external service data while the vehicle is driving.

When the vehicle needs to be recharged according to the low battery condition, that is, when it is impossible to travel up to a charging station on a guidance route by a remaining battery level, the processor 820 sets an adjacent charging station, which is suitable for the vehicle condition, as a new destination P1. A previously set destination is canceled. Thereafter, while the first AR object 1820 displays the current driving state of the vehicle, the separated second AR object guides the new destination P1 through a plurality of fragments.

At this time, the reason for changing to the new destination P1, namely, the low battery condition, and warning notification information may be output together through the separated second AR object.

When the location of the vehicle (or the location of the first AR object) approaches the new destination P1 within a predetermined distance, the separated second AR object moves to the location of the new destination P1. The moved second AR object 1810a is displayed along with additional information 1810b (e.g., 'Charge here!') suggesting battery charging.

Figure 19A:
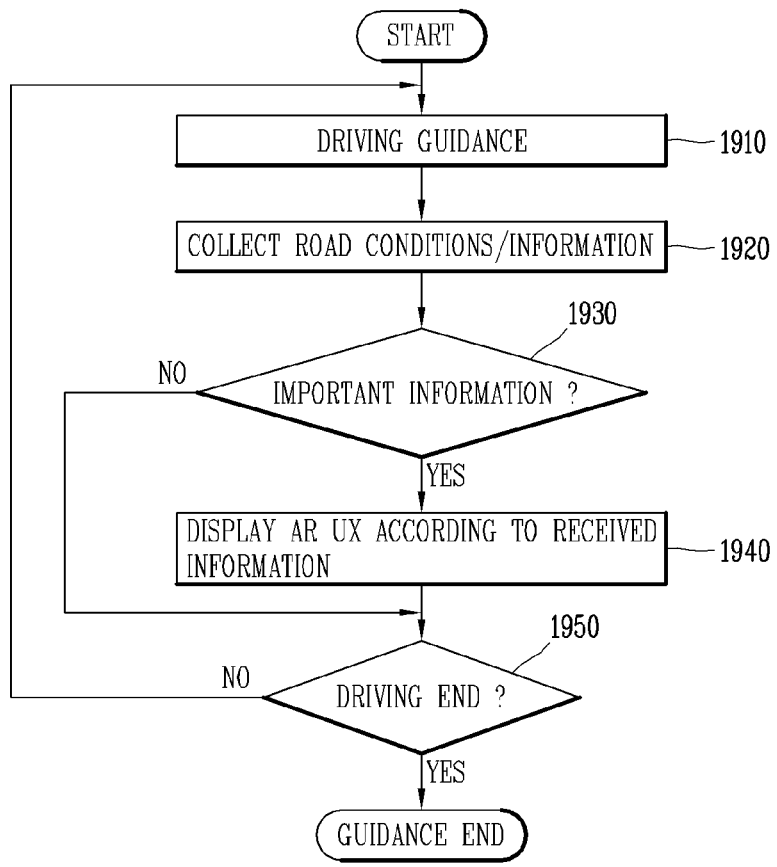
FIGS. 19A and 19B are a flowchart and a conceptual view referenced to describe a method of displaying a countermeasure with respect to congestion of a driving route and a determination of a possibility of detour through an AR graphic interface according to an embodiment of the present disclosure.
Figure 19B:
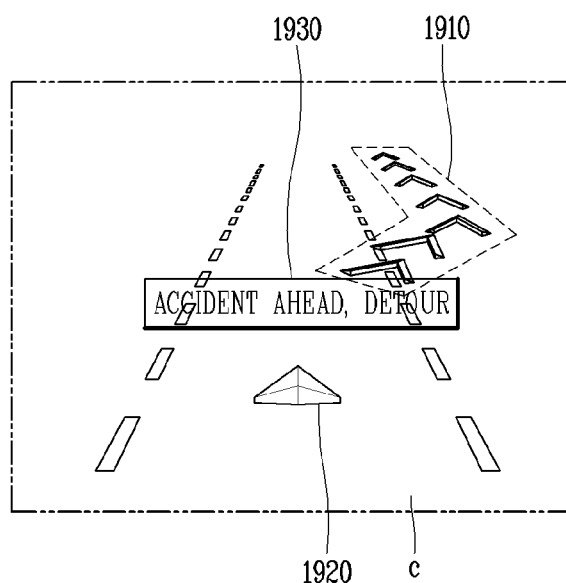

Next, FIGS. 19A and 19B are a flowchart and a conceptual view referenced to describe a method of displaying a countermeasure with respect to congestion of a driving route and a determination of a possibility of detour through an AR graphic interface according to an embodiment of the present disclosure.

Referring to the flowchart of FIG. 19A, the AR display device 800 according to the present disclosure may collect next (subsequent) road conditions/information (1920) while guiding the vehicle driving through the AR graphic interface (1910).

The processor 820 may receive ADAS sensing data, vehicle sensing data (e.g., CAN data), map data such as navigation/map/GPS data, and external service data in real time/periodically, and collect information related to the road conditions based on the received data (1920).

For example, the processor 820 may collect road condition information on a driving route through ADAS sensing data or external service data. Here, the road condition information may include accident information, construction information, and road states (e.g., road damage, pothole, sinkhole, etc.).

The processor 820 determines whether the collected road condition information is important information (1930). Here, whether or not the road condition information is important may be related to information regarding a driving route to a destination, information regarding a required driving time (e.g., gridlock, road congestion, etc.), and information regarding safe driving of the vehicle.

For example, the processor 820 may detect a faster route than a current driving route based on the collected road condition information, and may determine the detected fast route as important information. At this time, additional information (e.g., reduction time, driving distance, blockage information, etc.) regarding the new driving route may be provided together.

Also, for example, the processor 820 may determine whether to change a driving lane as important information when accident information on the current driving route is detected based on the collected road condition information. Alternatively, for example, the processor 820 determines whether or not to change a driving lane as important information when road bad condition information such as a pothole is detected (received) on the current driving route based on the collected road condition information.

When the collected information is determined as important information, the processor 820 may change the AR graphic interface based on the collected road condition information and render the changed AR graphic interface on the front image of the vehicle (1940).

Specifically, the processor 820 may display at least one of location information and situation information corresponding to the context, for example, the road condition information through the second AR object separated from the AR graphic interface, to guide the collected road condition information.

In this case, the at least one of the location and the situation information may be displayed in association with the current driving state of the vehicle corresponding to the first AR object displayed on the front image.

Here, the location information includes a new driving direction or driving route corresponding to the context, for example, the road condition information, based on the current location of the vehicle. And, the situation information may include road condition data collected with respect to a current driving lane or a set driving route of the vehicle.

According to an embodiment, the processor 820 may vary the separated second AR object to include guide trajectories for guiding the new driving direction or driving route, starting from the first AR object, based on the collected road condition data.

Referring to FIG. 19B, the first AR object 1920 indicating the current driving state of the vehicle is displayed on a front image, and the second AR object 1910 separated from the first AR object 1920 guides a driving lane change to a new driving direction or driving route, which corresponds to road condition information, through the plurality of fragments (or guide trajectories).

In this case, situation information 1930 based on the collected road condition data may be displayed through a part of the second AR object or through a third AR object. For example, 'Accident ahead, detour' may be displayed as the context information corresponding to the collected road condition data.

When the situation information 1930 is displayed through the part of the second AR object, the processor 820 may render the separated second AR object such that the situation information 1930 related to the road condition data is displayed between the first AR object 1920 and a start point of the guide trajectories of the second AR object 1910.

Meanwhile, when it is recognized that the estimated context has ended based on the network data, the processor 820 may render the AR graphic interface into the combined form of the first AR object and the second AR object.

Figure 20:
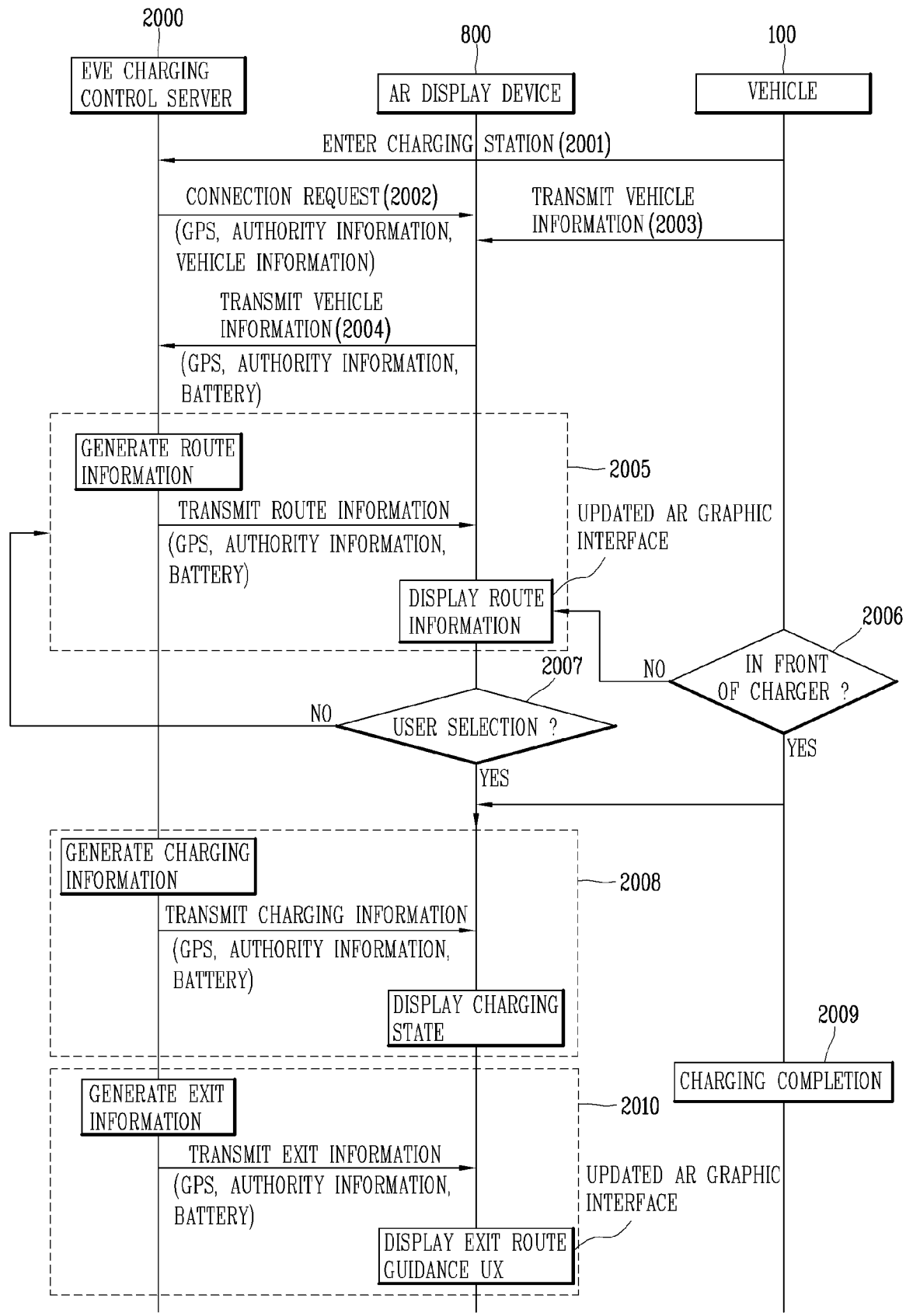
FIG. 20 is a flowchart referenced to explain a method of displaying route guidance, charging information, and exit route guidance for a charging allowable area through an AR graphic interface based on network data when a vehicle enters a charging station according to an embodiment of the present disclosure.

FIG. 20 is a flowchart referenced to explain a method of displaying route guidance, charging information, and exit route guidance for a charging allowable area through an AR graphic interface based on network data when a vehicle enters a charging station according to an embodiment of the present disclosure.

In FIG. 20, an EV charging control server (or system) is illustrated for explanation, but the process of FIG. 20 may be equally/similarly applied to a parking control server. Therefore, a parking lot/charging station control server described below was used to include both the EV charging control server and the parking control server.

When the vehicle enters a parking lot/charging station, the AR display device 800 may be connected to communicate with the parking lot/charging station control server (through the vehicle 100). Accordingly, as illustrated in FIG. the parking lot/charging station control server, for example, the EV charging to control system 2000, the AR display device 800, and the vehicle 100 may be connected to transmit requested data and/or receive the requested data.

The parking lot/charging station control server may be included in a digital-twin based system, which can control events (situations, operations, functions, etc.) occurred in the parking lot/charging station and devices (e.g., sensors, chargers, other linked device/equipment, etc.) using a digital twin technology.

A digital twin refers to a digital data model which is a replica of a real-world object (object, space, environment, process, procedure, etc.) and behaves identically in real time. The digital twin can represent virtual models of physical assets, such as objects, spaces, environments, people, and processes, using software to operate or behave identically to their real-world counterparts.

The parking lot/charging station control server (hereinafter, may be referred to as 'control server 2000') may include a communication module and a processor.

The communication module of the control server may receive sensing data from sensors installed in the parking lot/charging station. The processor of the control server may create a digital twin that can reflect a parking/charging situation in real time, and may remotely control the vehicle entering the parking lot/charging station when a predetermined condition is satisfied.

When the vehicle enters the parking lot/charging station, the processor 820 of the AR display device 800 may be connected to and communicate with a server provided in the parking lot/charging station, namely, the control server through the communication module 810, and provide state data of the vehicle to the control server.

The processor 820 may receive first route information guiding from the control server to a parking area/charger where the vehicle can be parked/charged, and display a first guide route by separating the second AR object of the AR graphic interface.

On the other hand, when the charging of the vehicle is finished (e.g., the charging is stopped or the vehicle is fully charged) or the parking is finished (e.g., the vehicle is ready to leave the parking area), the processor 820 may receive second route information guiding from the control server to an exit of the charging station, and updates the separated second AR object to display the second guide information.

Referring to FIG. 20, when the vehicle 100 enters a parking lot/charging station (2001), the control server 2000 may detect the entry of the vehicle through a sensor disposed in the parking lot/charging station.

The control server 2000 transmits a connection request to the vehicle 100 or the AR display device 800 connected to the vehicle 100 based on the detection of the entry of the vehicle 100 (2002). The connection request may include GPS information, authority information (vehicle control right), vehicle information, and the like.

In response to the connection request, the AR display device 800 receives vehicle information from the vehicle 100 (2003) and transmits the received vehicle information to the control server 2000 (2004). The vehicle information may include GPS information, authority information (vehicle control right), battery information, and the like.

The AR display device 800 may then receive information obtained from the control server 2000 (e.g., information related to a parking allowable area or a usable (fast or slow) charger based on information related to the entering vehicle), real-time parking lot/charging station information (e.g., charging unit price (rate per ultra-fast/fast/slow charging), occupancy of vehicles to be charged, charging waiting time, charger failure information, etc.).

In addition, the control server 2000 may receive from the AR display device 800 information (e.g., a remaining battery level, whether or not a remote control is possible, a protocol charging allowable time for a remote control, etc.) that is received from the AR display device 800 or acquired by the AR display device 800 through the sensor of the vehicle 100.

The AR display device 800 may receive information regarding a charger usage status and ultra-fast/fast/slow charger from the control server 2000, and display an AR graphic interface corresponding to the received information to induce selection.

The control server 2000 may identify a location of a vacant area or slot (charger) in which parking/charging is allowable based on sensing data of the sensor or absence of transmission data, and generate route information related to this (hereinafter, 'first route information'). The control server 2000 may generate the first route information based on object location estimation information generated based on the sensing data.

The first route information may be the shortest route connecting from the current location of the vehicle 100 to the location of the vacant area or slot (charger) where parking/charging is allowable.

The control server 2000 transmits the first route information to the AR display device 800 based on GPS information, authority information (vehicle control right), and battery information. The AR display device 800 changes the AR graphic interface based on the received first route information, that is, separates the second AR object from the AR graphic interface to display the first guide route corresponding to the first route information (2005).

On the other hand, when there is a plurality of parking areas or available chargers, the AR display device 800 may divide the separated second AR object based on a plurality of first route information, to display different selectable guide routes for guiding up to respective parking areas/chargers.

When it is detected that the vehicle has arrived in front of the parking area/charger along the guide through the separated second AR object (2006), whether to park/charge the vehicle is determined through a user selection input (2007).

When there is no user selection input or there is another selection input, the control server 2000 regenerates the first route information.

When the user selection input is detected, the control server 2000 generates charging information and transmits it to the AR display device 800. The AR display device 800 displays a charging state through the second AR object based on the received charging information (2008). In this case, the charging information may include charging unit price, occupancy of vehicles to be charged, charging waiting time, charger failure information, and the like.

While charging is in progress, the AR display device 800 may receive information regarding events/promotions associated with the parking lot/charging station (e.g., coffee discounts, car wash discounts, convenience store promotions, etc.) from the control server 2000, etc. and display the received information through the AR graphic interface.

The control server 2000 may detect the end of charging of the vehicle (e.g., charging stop or charging completion) or the end of parking (e.g., preparation for leaving the parking lot), based on communication data received through the sensor or from the vehicle 100 (2009).

Afterwards, the control server 2000 may generate, as exit information, second route information for guiding from the current location of the vehicle 100 to the exit of the parking lot/charging station, and transmit the generated information to the AR display device 800. The AR display device 800 may display a second guide route through the separated second AR object based on the received second route information (2010).

According to an embodiment, a final destination of the second route information may include another vehicle waiting information other than the exit of the parking lot/charging station.

Also, according to an embodiment, the AR display device 800 may collect information related to adjacent POIs as information for leaving the parking lot, and display the collected information through the second AR object.

As described above, in an AR display device and a method of operating the same according to an embodiment of the present disclosure, an AR navigation screen can be provided based on a front image that is calibrated without separate setting, and a predicted driving situation shown on a current navigation screen can be guided, together with a current location of a vehicle, by using AR objects, resulting in providing a more intuitive and realistic AR guidance to the vehicle.

In an AR display device and a method for operating the same according to an embodiment of the present disclosure, a context to possibly occur can be estimated by additionally considering an external resource such as network data in addition to sensing data and map data of a vehicle, which can result in providing an intuitive UX for more diverse driving situations that are predicted during driving. Accordingly, a driver can more easily and safely drive the vehicle. In addition, a possibility of collision with a hidden obstacle that is not visible in a front image can be avoided. In addition, when setting a vehicle in front to be followed, a driving direction and driving speed to be followed can be guided through an intuitive AR graphic interface, which can allow flexible following and avoidance of a possibility of collision. Also, a notification and countermeasure for a vehicle condition diagnosis can be provided more reliably, and a detour route can be provided by identifying in advance road congestion that is difficult to be confirmed based on navigation information. In addition, when the vehicle enters a parking lot or charging station, a route guidance for a parking/charging allowable area, parking/charging related information, and a route guidance for an exit can be provided through a more intuitive AR graphic interface, thereby providing a direct and smart parking/charging related UX.

The present disclosure can be implemented as computer-readable codes (applications or software) in a program-recorded medium. The method of controlling the autonomous vehicle can be realized by a code stored in a memory or the like.

The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the processor or the controller. Therefore, the detailed description should not be limitedly construed in all of the aspects, and should be understood to be illustrative. The scope of the present disclosure should be determined by rational interpretation of the appended claims, and all changes within the scope of equivalents of the present disclosure are included in the scope of the present disclosure.

The invention claimed is:

1. An augmented reality, AR, display device for a vehicle comprising:
   a communication module configured to receive image data including a front image of the vehicle, location data including a current location of the vehicle, map data relating to the current location of the vehicle, state data of the vehicle, and network data obtained from an external resource;
   a processor configured to activate a preset application to render an AR graphic interface overlapping the front image, the AR graphic interface including a first AR object indicating a current driving state of the vehicle and a second AR object indicating a guide for driving based on the current location of the vehicle and the map data; and
   a display configured to display a navigation screen including the front image overlapped by the AR graphic interface according to the rendering,
   wherein the processor is further configured to:
   predict a context to occur based on the state data of the vehicle and the network data, and
   update the AR graphic interface based on the prediction in a manner of separating the second AR object from the first AR object to a location associated with an occurrence of the predicted context while the first AR object keeps being displayed and changing the separated second AR object into driving guide information related to the predicted context,
   wherein the driving guide information includes additional information related to the predicted context, and
   join the second AR object to the first AR object when the predicted context is determined to have ended.

2. The AR display device of claim 1, wherein the context to occur comprises one of as below:
   a detection of hidden obstacles that do not appear in the front image in front of the vehicle and possibility of collision, a detection of a possibility of collision with a route to be followed and a possibility of collision due to a selection of a vehicle in front to be followed, diagnostic prediction and determination of driving prohibition based on a state of the vehicle, congestion and a possibility of detouring of a current driving route, and a detection of a charging allowable area due to the vehicle entering a charging station.

3. The AR display device of claim 2, where the processor is configured to update the second AR object, which is separated from the first AR object, to be displayed at a location associated with an occurrence of the predicted context while the first AR object keeps displaying the current driving state of the vehicle.

4. The AR display device of claim 3, wherein the processor is configured to determine whether to include additional information in the second AR object based on a separation distance between the displayed location of the separated second AR object and a current location of the vehicle corresponding to the first AR object, and change the separated second AR object based on the determination.

5. The AR display device of claim 4, wherein the additional information includes at least one of a warning about the hidden obstacles, a change in driving speed or driving direction of the vehicle in front to be followed, inspection of the vehicle, charging of the vehicle, route guidance in a parking or stopping area, guidance for congestion-related information and detour route, charging status, and rate information of the charging of the vehicle.

6. The AR display device of claim 1, wherein the processor is configured to determine a detection of the context to occur by combining the network data with at least one of the map data, sensing data of the vehicle, or location data updated of the vehicle, and display at least one of location information or situation information corresponding to the context through the separated second AR object on the front image based on the determination.

7. The AR display device of claim 6, wherein the at least one of the location information or the situation information is associated with the current driving state of the vehicle corresponding to the first AR object.

8. The AR display device of claim 7, wherein the separated second AR object includes a plurality of fragments, and wherein the processor is configured to change the separated second AR object such that the plurality of fragments displays a plurality of trajectories drawn from the first AR object toward a location of an object corresponding to the context.

9. The AR display device of claim 8, wherein the plurality of trajectories includes a driving guide for a next driving state of the vehicle predicted based on a moving of the object corresponding to the context.

10. The AR display device of claim 7, wherein the location information includes a new driving direction or driving route corresponding to the context based on a current location of the vehicle updated, and wherein the situation information includes road condition data collected with respect to a current driving lane or a set driving route of the vehicle.

11. The AR display device of claim 10, wherein the processor is configured to change the separated second AR object to include guide trajectories for guiding the new driving direction or driving route, starting from the first AR object, based on the collected road condition data.

12. The AR display device of claim 11, wherein the processor updates the separated second AR object to display information related to the road condition data between the first AR object and the guide trajectories.

13. The AR display device of claim 1, wherein the network data includes one or more of: third party service related data received during the driving of the vehicle, intelligent transportation system (ITS) related data, V2V/V2X communication data, and communication data received from a parking/charging control server.

14. The AR display device of claim 1, wherein the processor is configured to update the AR graphic interface to joining the separated second AR object to the first AR object when it is recognized that the predicted context has ended based on the network data.

15. The AR display device of claim 1, wherein in response to the vehicle entering a charging station, the processor is configured to connect communication with a server disposed in the charging station through the communication module to provide state data of the vehicle, through a communication module of the server, to the server, separate the second AR object from the first AR object to display a first guide route by receiving first route information for guiding the vehicle to an available charger from the server based on the state data, and update the separated second AR object to display a second guide route by receiving second route information for guiding the vehicle up to an exit of the charging station from the server when charging of the vehicle ends.

16. The AR display device of claim 15, wherein when there is a plurality of available chargers, the processor is configured to separate at least a part of the separated second AR object to display different selectable guide routes for guiding the vehicle up to respective ones of the plurality of available chargers.

17. The AR display device of claim 15, wherein the processor is configured to update the second AR object to additionally display charging information received from the server, in response to the vehicle approaching the available charger along the first guide route displayed through the separated second AR object.

* * * * *